US012619393B2

(12) United States Patent
Yang et al.

(10) Patent No.: US 12,619,393 B2
(45) Date of Patent: May 5, 2026

(54) VIDEO PLAYING METHOD AND DEVICE

(71) Applicant: HUAWEI TECHNOLOGIES CO., LTD., Guangdong (CN)

(72) Inventors: Xiao Yang, Shenzhen (CN); Bo Han, Shanghai (CN); Chunjian Li, Shanghai (CN); Junqing Luo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 700 days.

(21) Appl. No.: 17/925,393

(22) PCT Filed: May 26, 2021

(86) PCT No.: PCT/CN2021/096049
§ 371 (c)(1),
(2) Date: Nov. 15, 2022

(87) PCT Pub. No.: WO2021/244368
PCT Pub. Date: Dec. 9, 2021

(65) Prior Publication Data
US 2023/0185518 A1      Jun. 15, 2023

(30) Foreign Application Priority Data

May 30, 2020    (CN) .......................... 202010480576.8

(51) Int. Cl.
| *H04N 5/77* | (2006.01) |
| *G06F 3/0484* | (2022.01) |
| *G06F 3/16* | (2006.01) |

(52) U.S. Cl.
CPC ............ *G06F 3/165* (2013.01); *G06F 3/0484* (2013.01); *H04N 5/77* (2013.01)

(58) Field of Classification Search
USPC ......................................................... 386/223
See application file for complete search history.

(56) References Cited

U.S. PATENT DOCUMENTS

| 8,843,375 | B1 * | 9/2014 | Ubillos | .................. | G10L 21/10 704/278 |
| 9,602,732 | B2 * | 3/2017 | Mäkinen | ................ | H04R 5/027 |
| 9,742,971 | B2 * | 8/2017 | Richards | ................ | H04N 23/57 |
| 10,431,216 | B1 * | 10/2019 | Lemon | .................... | H04L 51/10 |

(Continued)

FOREIGN PATENT DOCUMENTS

| CN | 103516895 A | 1/2014 |
| CN | 104699445 A | 6/2015 |

(Continued)

*Primary Examiner* — Nigar Chowdhury

(57) ABSTRACT

The technical solutions of this application provide a video playing method and a device, so that in a multi-view mode, during video playback, audio corresponding to an image in a plurality of views may be selected and played based on an operation performed on a play control. In response to a user input, a video playing interface is displayed on the electronic device. The video playing interface includes a first video, a second video, a first play control, and a second play control. In response to an operation performed on the second play control, the first video and the second video are played. Audio of a video corresponding to a location of the first play control is played. The video corresponding to the location of the first play control is the first video.

14 Claims, 17 Drawing Sheets

(56) References Cited

U.S. PATENT DOCUMENTS

| | | | |
|---|---|---|---|
| 10,432,687 B1* | 10/2019 | Hanes | G06T 5/40 |
| 10,640,046 B1* | 5/2020 | Englander | B60R 1/04 |
| 10,645,294 B1* | 5/2020 | Manzari | H04N 23/74 |
| 10,735,642 B1* | 8/2020 | Manzari | H04N 23/631 |
| 10,805,530 B2* | 10/2020 | Karpenko | G06F 3/0488 |
| 11,039,214 B2* | 6/2021 | Lewis | H04N 21/47 |
| 11,145,306 B1* | 10/2021 | Harris | G06F 3/0482 |
| 11,308,952 B2* | 4/2022 | Li | G10L 15/22 |
| 12,079,439 B2* | 9/2024 | Wright, Jr. | G06T 7/74 |
| 2008/0172693 A1* | 7/2008 | Ludvig | H04N 21/4438 |
| | | | 348/E7.071 |
| 2010/0328423 A1* | 12/2010 | Etter | H04N 7/142 |
| | | | 348/E7.083 |
| 2011/0107272 A1* | 5/2011 | Aguilar | G06F 3/04883 |
| | | | 345/173 |
| 2012/0223456 A1* | 9/2012 | Patrigeon | B29C 33/405 |
| | | | 425/542 |
| 2013/0076782 A1* | 3/2013 | Sirpal | G06F 3/1446 |
| | | | 345/1.3 |
| 2013/0129103 A1* | 5/2013 | Donaldson | G10K 11/16 |
| | | | 381/71.1 |
| 2013/0222431 A1* | 8/2013 | Joo | G06F 3/0488 |
| | | | 345/649 |
| 2013/0342731 A1* | 12/2013 | Lee | H04R 5/04 |
| | | | 348/231.4 |
| 2014/0169766 A1* | 6/2014 | Yu | G11B 27/34 |
| | | | 386/282 |
| 2014/0359651 A1* | 12/2014 | Lee | H04N 21/472 |
| | | | 725/25 |
| 2014/0362995 A1* | 12/2014 | Backman | H04S 7/301 |
| | | | 381/17 |
| 2014/0368734 A1* | 12/2014 | Hoffert | H04N 21/47 |
| | | | 348/564 |
| 2015/0049004 A1* | 2/2015 | Deering | H04N 13/344 |
| | | | 345/8 |
| 2015/0110460 A1* | 4/2015 | Choi | H04N 5/222 |
| | | | 386/224 |
| 2016/0336039 A1* | 11/2016 | Leiberman | G11B 27/28 |
| 2017/0046123 A1* | 2/2017 | Song | H04S 7/30 |
| 2017/0068511 A1* | 3/2017 | Brown | G06F 3/04847 |
| 2017/0085764 A1* | 3/2017 | Kim | H04N 23/63 |
| 2017/0243617 A1* | 8/2017 | Lee | G11B 27/031 |
| 2017/0289458 A1* | 10/2017 | Song | H04N 23/698 |
| 2018/0084545 A1* | 3/2018 | Hosseini | H04L 5/0053 |
| 2018/0295427 A1* | 10/2018 | Leiberman | H04N 21/8456 |
| 2018/0329672 A1* | 11/2018 | Sadak | G06F 1/1649 |
| 2018/0335903 A1* | 11/2018 | Coffman | G06F 3/04847 |
| 2019/0121601 A1* | 4/2019 | Li | H04N 5/04 |
| 2019/0138262 A1* | 5/2019 | Becherer | G06F 3/165 |
| 2019/0306566 A1* | 10/2019 | Zaatarah | G06F 3/0488 |
| 2019/0350563 A1* | 11/2019 | Omero | H04N 21/835 |
| 2020/0177992 A1* | 6/2020 | Kang | H04R 1/406 |
| 2020/0192532 A1* | 6/2020 | Van Wiemeersch | G06F 3/016 |
| 2020/0244854 A1* | 7/2020 | Lee | H04N 23/45 |
| 2020/0335120 A1* | 10/2020 | Candelore | H04N 21/4728 |
| 2021/0241736 A1* | 8/2021 | Packouz | B60S 1/0848 |
| 2023/0331159 A1* | 10/2023 | Englander | B60R 1/04 |
| 2024/0031474 A1* | 1/2024 | Lyren | H04M 1/72469 |

FOREIGN PATENT DOCUMENTS

| | | |
|---|---|---|
| CN | 105165017 A | 12/2015 |
| CN | 105706462 A | 6/2016 |
| CN | 106027933 A | 10/2016 |
| CN | 107608601 A | 1/2018 |
| CN | 109413563 A | 3/2019 |
| CN | 110072070 A | 7/2019 |
| CN | 110381197 A | 10/2019 |
| KR | 101632435 B1 | 6/2016 |

* cited by examiner

100

801 — Generate a video by using a multi-view mode

802 — Play the video

803 — Played audio related to a location of a play control

VIDEO PLAYING METHOD AND DEVICE

CROSS-REFERENCE TO RELATED APPLICATIONS

This application is a national stage of International Application No. PCT/CN2021/096049, filed on May 26, 2021, which claims priority to Chinese Patent Application No. 202010480576.8 filed on May 30, 2020. Both of the aforementioned applications are hereby incorporated by reference in their entireties.

TECHNICAL FIELD

This application relates to the field of electronic technologies, and in particular, to a video playing method and a device.

BACKGROUND

With improvement of a computing capability and a hardware capability of an electronic device such as a mobile phone or a tablet, it is increasingly common to shoot a video and perform live streaming by using the electronic device such as the mobile phone (or another mobile device).

When the mobile device such as the mobile phone is used to shoot a video, to increase shooting flexibility and fun, a "dual-view" function is provided, that is, a screen for display is divided into two sub-images for simultaneous shooting. For example, one image is shot at a wide angle, and the other image is used to zoom in and shoot a key figure. How to play audio in a dual-view mode may be a problem to be resolved.

SUMMARY

The technical solutions of this application provide a video playing method and a device. In a multi-view mode, during video playback, audio corresponding to an image in a plurality of views may be selected and played based on an operation performed on a play control.

According to a first aspect, the technical solutions of this application provide a video playing method, applied to an electronic device that includes but is not limited to a mobile phone. The method includes:

in response to a user input, displaying a video playing interface on the electronic device, where the video playing interface includes a first video, a second video, and a first play control;

playing the first video and the second video; and playing audio of a video corresponding to a location of the first play control.

It can be learned from the foregoing that, during multi-view video playing, the audio of the video corresponding to the location of the first play control may be played by performing an operation on the first play control. For example, a user drags the first play control to a location of the first video to play audio corresponding to the first video. For another example, the user may drag the first play control to a location at which the first video and the second video are located. In this case, audio corresponding to the first video and the second video may be played.

In an implementation, the video playing interface further includes a second play control, and the playing the first video and the second video includes:

in response to an operation performed on the second play control, playing the first video and the second video, where the second play control may alternatively be a play control, and in response to an operation such as user tapping or voice input performed by the user on the play control, the electronic device plays the first video and the second video.

In an implementation, the first play control is located in the second video.

The electronic device may further play, in response to the operation performed by the user on the first play control, the audio corresponding to the second video and stop playing the audio corresponding to the first video.

The first play control may be a horn-shaped control, indicating that audio may be played. It may be understood that the first play control may have another shape, for example, a triangle.

The second play control may be a play/pause control. When the user taps the control, a video may be played or paused. It may be understood that the second play control may alternatively be a control having another function, or may be controlled through a voice. For example, the operation performed by the user on the second play control may be a voice operation or a voice instruction.

In an implementation, the operation performed by the user on the first play control may also be a voice operation or a voice instruction.

In an implementation, the first play control is located in the first video and the second video.

The electronic device may further play, in response to the operation performed by the user on the first play control, mixing audio. The mixing audio is mixing audio of the audio corresponding to the first video and the audio corresponding to the second video.

The case in which the first play control is located in the first video and the second video may be that the first play control is located in the middle of the first video and the second video, or the first play control crosses the first video and the second video.

In an implementation, the audio corresponding to the first video is stored in a first audio track, and the audio corresponding to the second video is stored in a second audio track.

In a possible implementation, the audio corresponding to the first video is stored in a first sound channel, and the audio corresponding to the second video is stored in a second sound channel.

The first audio track may include a plurality of sound channels, and the second audio track may also include a plurality of sound channels.

In an implementation, the first video and the audio corresponding to the first video are one video file, and the second video and the audio corresponding to the second video are another video file.

Alternatively, the first video, the audio corresponding to the first video, the second video, and the audio corresponding to the second video are one video file.

Alternatively, the first video, the second video, and the audio corresponding to the first video are one video file.

Alternatively, the first video, the second video, and the audio corresponding to the second video are another video file.

In an implementation, when the first video, the second video, and the audio corresponding to the first video are one video file, the audio corresponding to the second video is one audio file.

Alternatively, when the second video, the first video, and the audio corresponding to the second video are another video file, the audio corresponding to the first video is one audio file.

According to a second aspect, the technical solutions of this application provide a video generation method. The method includes:

in response to a first user input, opening a camera to display a preview interface;

entering a multi-view mode to display a video preview interface, where the video preview interface includes a plurality of channels of video images;

in response to a second user input, collecting the plurality of channels of video images, and collecting audio data;

in a process of collecting the plurality of channels of videos, in response to a zoom operation performed by a user on at least one of the plurality of channels of videos, processing collected audio data corresponding to the at least one channel of video; and generating a video and audio, where each of the plurality of channels of videos is collected by a different camera; and the zoom operation is zooming in or zooming out on the at least one channel of video, to correspondingly change a focal length of a camera corresponding to the at least one channel of video.

In an implementation, the video is one video file, or the video is two video files. The plurality of channels of videos may be two channels of videos.

In an implementation, the plurality of channels of videos are the two channels of videos, and the audio includes first audio and second audio. The first audio corresponds to audio of one channel of video image of the two channels of video images, and the second audio corresponds to audio of the other channel of video image of the two channels of video images.

In an implementation, when the video is one video file, the video file further includes the first audio, and the second audio is one audio file.

Alternatively, when the video is two video files, one video file includes the first audio, and the other video file includes the second audio.

Alternatively, when the video is one video file, the video file includes the first audio and the second audio.

In an implementation, when the video file includes the first audio and the second audio, the first audio is stored in a first audio track, and the second audio is stored in a second audio track.

In an implementation, when the video file includes the first audio and the second audio, the first audio is stored in a first sound channel, and the second audio is stored in a second sound channel.

It may be understood that the two channels of video images may alternatively be three channels of video images or a plurality of channels of video images.

According to a third aspect, the technical solutions of this application provide an electronic device, including a memory, a processor coupled to the memory, and one or more computer programs. The one or more computer programs are stored in the memory, the one or more computer programs include instructions, and when the instructions are executed by the electronic device, the electronic device is enabled to implement the method according to the first aspect and/or the second aspect.

According to a fourth aspect, the technical solutions of this application provide a chip system. The chip system is applied to an electronic device, the chip includes one or more processors, and the processor is configured to invoke computer instructions to enable the electronic device to perform the method according to the first aspect and the second aspect.

According to a fifth aspect, the technical solutions of this application provide a computer-readable storage medium, including instructions. When the instructions are run on an electronic device, the electronic device is enabled to perform the method according to the first aspect and the second aspect.

According to a sixth aspect, the technical solutions of this application provide a video playing method, including:

in response to a user input, displaying a video playing interface, where the video playing interface includes a first video, a second video, and a first play control;

playing the first video and the second video; and playing audio of a video corresponding to a location of the first play control.

The video playing interface further includes a second play control, and the playing the first video and the second video includes:

in response to an operation performed on the second play control, playing the first video and the second video.

The video corresponding to the location of the first play control is the first video.

Alternatively, in an implementation, the first play control is located in the second video.

In response to an operation performed by a user on the first play control, audio corresponding to the second video is played and audio corresponding to the first video is stopped playing.

Alternatively, in an implementation, the first play control is located in the first video and the second video.

In response to the operation performed by the user on the first play control, mixing audio is played. The mixing audio is mixing audio of the audio corresponding to the first video and the audio corresponding to the second video.

In an implementation, the audio corresponding to the first video is stored in a first audio track, and the audio corresponding to the second video is stored in a second audio track.

Alternatively, the audio corresponding to the first video is stored in a first sound channel, and the audio corresponding to the second video is stored in a second sound channel.

Alternatively, the first video and the audio corresponding to the first video are one video file, and the second video and the audio corresponding to the second video are another video file.

Alternatively, the first video, the audio corresponding to the first video, the second video, and the audio corresponding to the second video are one video file.

Alternatively, the first video, the second video, and the audio corresponding to the first video are one video file.

Alternatively, the first video, the second video, and the audio corresponding to the second video are one video file.

In an implementation, when the first video, the second video, and the audio corresponding to the first video are one video file, the audio corresponding to the second video is another audio file.

Alternatively, when the first video, the second video, and the audio corresponding to the second video are one video file, the audio corresponding to the first video is another audio file. The video corresponding to the location of the first play control is the first video and the second video.

According to a seventh aspect, the technical solutions of this application provide an electronic device, including a microphone, a speaker, a display, a plurality of cameras, and a processor. The processor is coupled to the microphone, the speaker, the display, and the plurality of cameras.

The microphone is configured to collect audio data.

The plurality of cameras are configured to collect a plurality of channels of videos. Each of the plurality of channels of videos is collected by a different camera.

The display is configured to display a video playing interface. The video playing interface includes a first video, a second video, and a first play control.

The processor is configured to play the first video and the second video.

The speaker is configured to play audio of a video corresponding to a location of the first play control.

In an implementation, the video corresponding to the location of the first play control is the first video.

In an implementation, the first play control is located in the second video.

The processor is configured to:

in response to an operation performed by a user on the first play control, control the speaker to play audio corresponding to the second video and stop playing audio corresponding to the first video.

In an implementation, the first play control is located in the first video and the second video.

The processor is configured to: in response to the operation performed by the user on the first play control, control the speaker to play mixing audio. The mixing audio is mixing audio of the audio corresponding to the first video and the audio corresponding to the second video.

In an implementation, the video corresponding to the location of the first play control is the second video.

In an implementation, the video corresponding to the location of the first play control is the first video and the second video.

In an implementation, the video playing interface further includes a second play control.

The first play control is an audio play control.

The second play control is a play control or a play/pause control.

It can be learned from the foregoing that, during multi-view video playing, the audio of the video corresponding to the location of the first play control may be played by performing an operation on the first play control. For example, the user drags the first play control to a location of the first video to play the audio corresponding to the first video. For another example, the user may drag the first play control to a location at which the first video and the second video are located. In this case, audio corresponding to the first video and the second video may be played.

BRIEF DESCRIPTION OF DRAWINGS

To describe the technical solutions in embodiments or in the background more clearly, the following briefly describes the accompanying drawings for describing embodiments of this application or the background.

DESCRIPTION OF EMBODIMENTS

The following describes the technical solutions in embodiments of this application with reference to the accompanying drawings in embodiments of this application.

When using a recording function of an electronic device, a user may select a multi-view mode. The multi-view mode may be that, during video recording, a plurality of cameras may be used at the same time to perform video recording. In this way, images recorded by the plurality of cameras may be displayed on a preview interface of video recording. A video recorded by each camera may be referred to as one channel of video image. These images may be displayed on the preview interface in a splicing mode or a picture-in-picture mode.

Figure 1A:
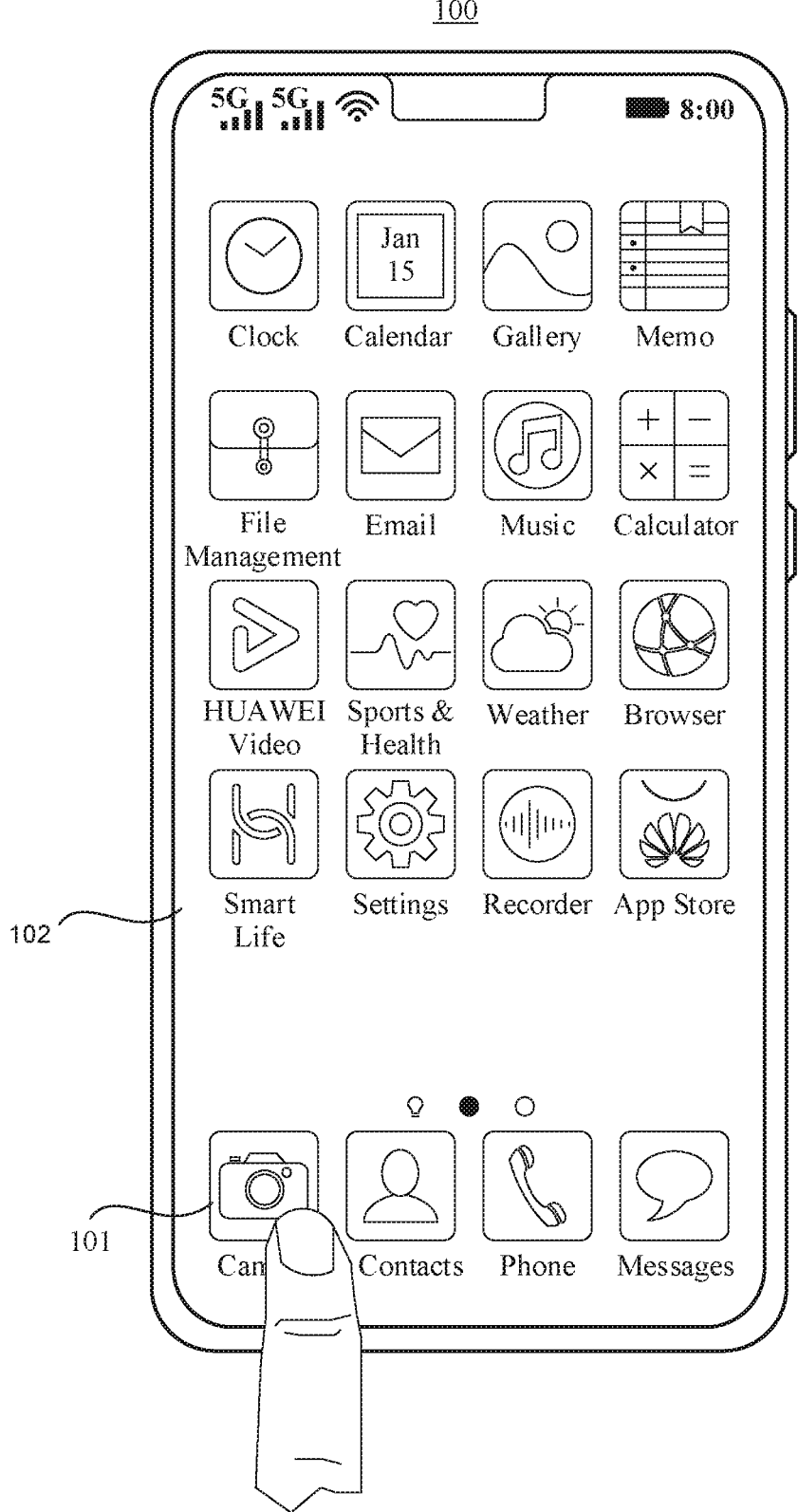
FIG. 1A shows an operation interface of an electronic device according to an embodiment of this application.
Figure 1B:
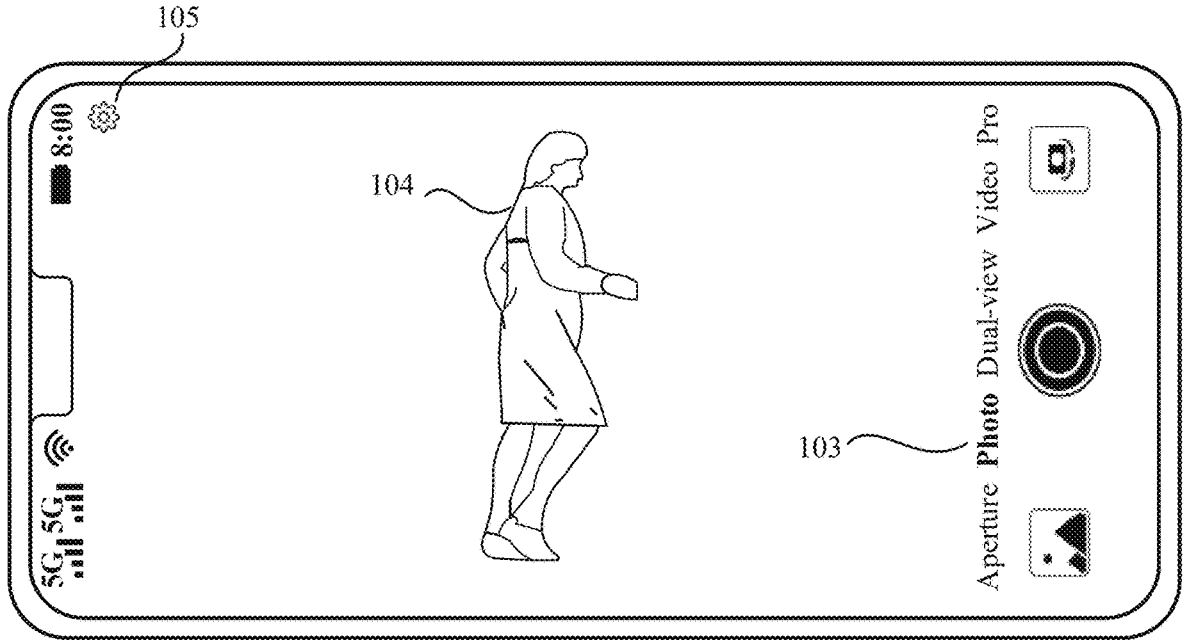
FIG. 1B shows an operation interface of a camera application according to an embodiment of this application.
Figure 1C:
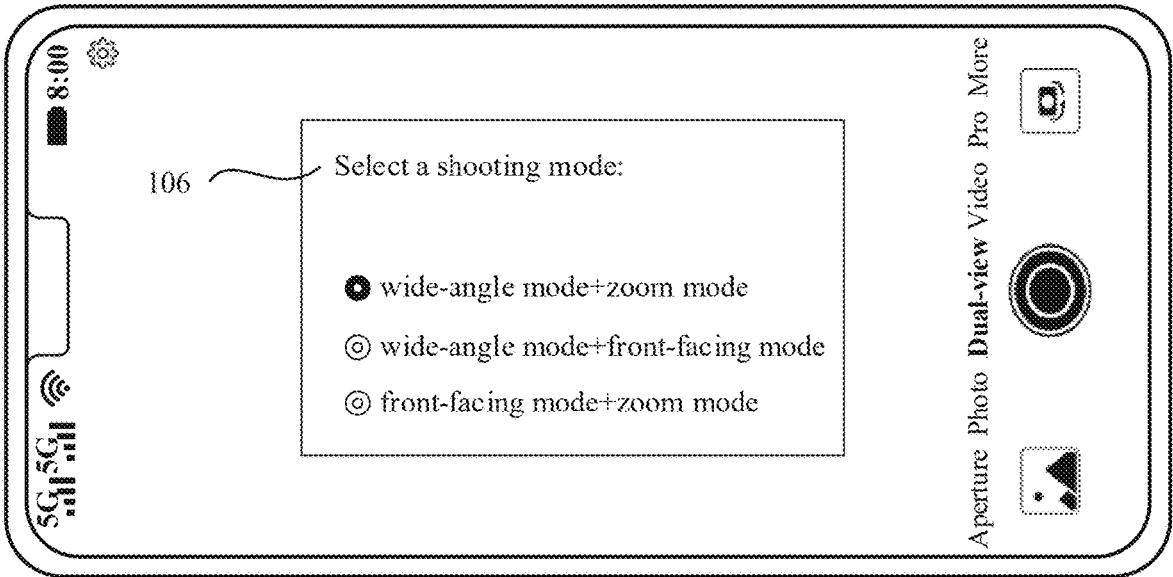
FIG. 1C shows another operation interface of a camera application according to an embodiment of this application.

In an embodiment of this application, a dual-view mode is used as an example for description. As shown in FIG. 1A, a mobile phone is used as an example of an electronic device 100. The mobile phone 100 may display an interface 102. The interface 102 displays an icon 101 of a camera application. For example, icons of a plurality of applications (for example, application icons such as Clock, Calendar, Gallery, and Settings) may be displayed in an upper half of the interface 102, and commonly used application icons (for example, application icons such as Camera, Contacts, Phone, and Messages) may be displayed in a lower half of the interface 102. A user may tap the camera application 101 to enter a shooting preview interface. FIG. 1B shows the shooting preview interface after the camera application 101 is entered. The shooting preview interface includes a setting control 105, image content 104, and a multi-function bar 103. When the user taps the setting control 105, a setting interface of the camera application 101 may be entered. After entering the setting interface, the user may change setting information such as resolution, reference lines, and sound control shooting. The reference lines are longitude and latitude lines displayed in a shooting interface to assist shooting. As shown in FIG. 1C, in the dual-view mode, the user may select a setting control 105 to enter the setting interface. The setting interface includes "Select a shooting mode 106". For example, in "Select a shooting mode 106", the user may select two specific cameras to perform dual-view recording. The image content 104 may be, by default, an image collected by a wide-angle camera. The image content 104 in FIG. 1B is a walking figure. The multi-function bar 103 may include functions for the user to select. For example, the multi-function bar 013 includes a dual-view function, and may further include various functions such as a wide aperture function, a shooting function, a recording function, and/or a professional function. The wide aperture function can be used to control an aperture size of a lens on the camera, to control a depth of field, lens imaging quality, and a shutter to coordinately control an amount of entered light. If the user uses the wide aperture function, for example, uses a wide aperture to perform shooting, the wide aperture may make the depth of field shallower, so that a focus is clear, and another part of an image is relatively blurred. This helps highlight a subject and simplify the image. The shooting function is a default function used after the camera application is entered. A photo is shot when the shooting function is enabled. During shooting, a focal length may be changed by using a zoom-in or zoom-out gesture. After the user taps a shooting button, the camera performs a shooting operation, and stores a shot photo in an album. In an implementation, camera switching may be further implemented by using the zoom-in or zoom-out gesture. The recording function enables the user to use the camera to perform video recording and store a recorded video in an album or a folder. The professional function provides more adjustments to camera parameters for the user, such as professional parameters of exposure, sensitivity, and white balance, so that the user can shoot a desired photo. The shooting preview interface may further include the shooting button. In the shooting function, the user may tap the shooting button to perform shooting. In the dual-view function, the user may perform dual-view recording by tapping the shooting button. In an implementation, the shooting preview interface further includes an album button and a lens switch button. When tapping the album button, the user may enter a gallery folder of the mobile phone 100, to view a photo and a multimedia file such as a recorded video or audio that are shot by the user. When the user taps the lens switch button, a rear-facing camera that is being used may be switched to a front-facing camera (certainly, the front-facing camera may alternatively be switched to the rear-facing camera).

It may be understood that shooting may further be performed through voice input. For example, the user inputs "shoot" through a voice, and the mobile phone may perform the shooting function.

As shown in FIG. 1B and FIG. 1C, after the user taps the dual-view function, the dual-view mode is entered, and a dialog box 106 may pop up by default (or the dialog box 106 may pop up by tapping the setting control 105). In the dialog box 106, the user may be prompted to select different shooting modes, including but not limited to a wide-angle mode+a zoom mode, a wide-angle mode+a front-facing mode, and a front-facing mode+a zoom mode. During dual-view recording, there may be a plurality of combinations of cameras for collecting two channels of video images, for example, a combination 1: a rear-facing camera+a rear-facing camera; a combination 2: a rear-facing camera+a front-facing camera; and a combination 3: a front-facing camera+a front-facing camera. The rear-facing camera may include but is not limited to a rear-facing wide-angle camera, a rear-facing zoom camera, a rear-facing fixed-focus camera, a rear-facing long-focus camera, and the like. The rear-facing camera+the rear-facing camera may be any two cameras of the rear-facing wide-angle camera, the rear-facing zoom camera, the rear-facing fixed-focus camera, and the rear-facing long-focus camera. The front-facing camera may include but is not limited to a front-facing wide-angle camera, a front-facing zoom camera, a front-facing fixed-focus camera, and the like. The front-facing camera+the front-facing camera may be any two cameras of the front-facing wide-angle camera, the front-facing zoom camera, and the front-facing fixed-focus camera. The rear-facing camera+the front-facing camera may be one of the rear-facing wide-angle camera, the rear-facing zoom camera, the rear-facing fixed-focus camera, and the rear-facing long-focus camera+one of the front-facing wide-angle camera, the front-facing zoom camera, and the front-facing fixed-focus camera.

Figure 1D:
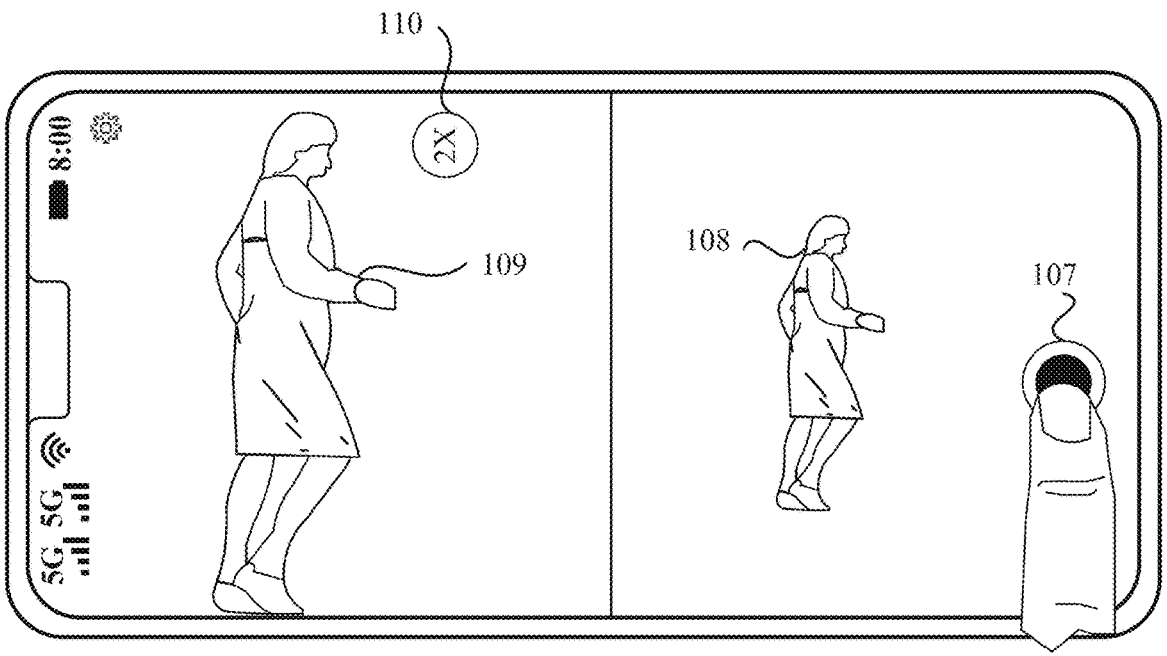
FIG. 1D to FIG. 1G show different operation interfaces in a dual-view mode according to an embodiment of this application.

Different cameras may generate different audio in a recording process. As shown in FIG. 1D, after selecting the shooting mode, the user enters the shooting preview interface of the dual-view mode. For example, the user selects the wide-angle mode+the zoom mode, and uses the rear-facing wide-angle camera and the rear-facing zoom camera. As shown in FIG. 1D, in the shooting mode, the wide-angle camera and the zoom camera are used to perform shooting together. On the shooting preview interface, an image collected by the zoom camera includes image content 109, and the image content 109 may be a figure image collected by the zoom camera after double zooming is performed. In the image collected by the zoom camera, there is also a zoom multiple indication control 110. The control may indicate a zoom multiple currently used when the zoom camera collects an image. The user may perform a zoom operation on the image content 109 (or zoom either of two pieces of image content). When the user performs the zoom operation on the image, a focal length of the camera may be changed. When the camera zooms, the zooming may be optical zooming or digital zooming. Image content 108 is a figure image collected by the wide-angle camera. The two images may be arranged side by side on the preview interface, or may be displayed on the preview interface in any display ratio. The two images may be displayed in a splicing mode or a picture-in-picture mode. The shooting preview interface further includes a recording control 107. After the user taps the recording control 107, the mobile phone 100 starts to perform dual-view recording.

Figure 1E:
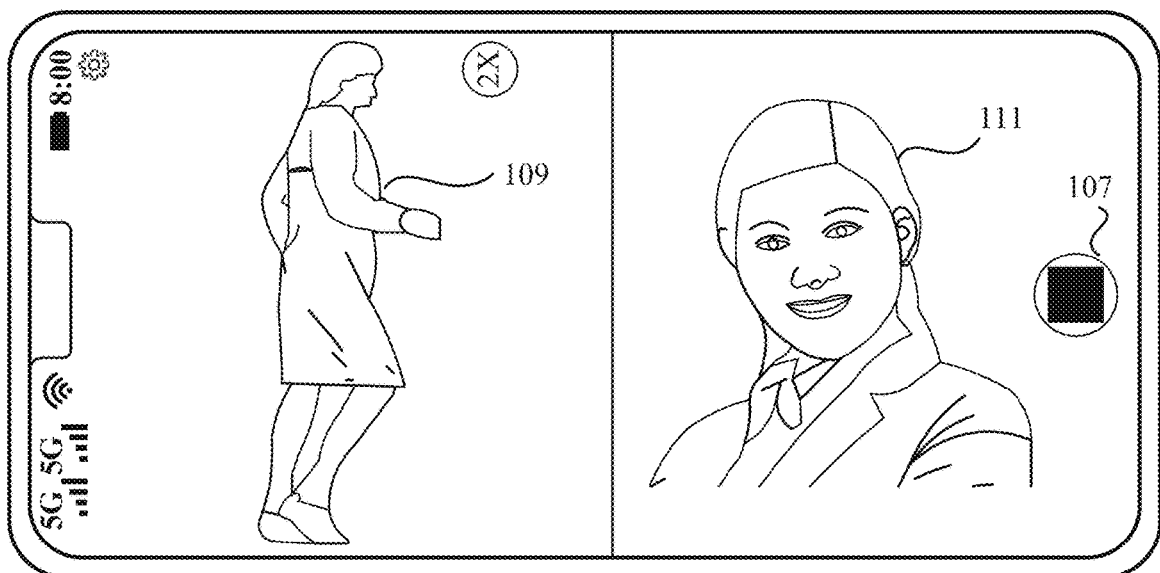

Similarly, FIG. 1E is a schematic diagram in which the user performs dual-view recording by using the front-facing camera and the rear-facing zoom camera in the front-facing mode+the zoom mode. After the user taps the recording control 107, dual-view recording starts. The recording control 107 may change a shape to indicate a change of a recording status. For example, after the user taps the recording control 107, a circular countdown may be displayed. For example, a preset time period such as 10 seconds or 8 seconds may be set. After the preset time period expires, dual-view recording is completed. In this mode, the image content 109 collected by the zoom camera and image content 111 collected by the front-facing camera are included.

Figure 1F:
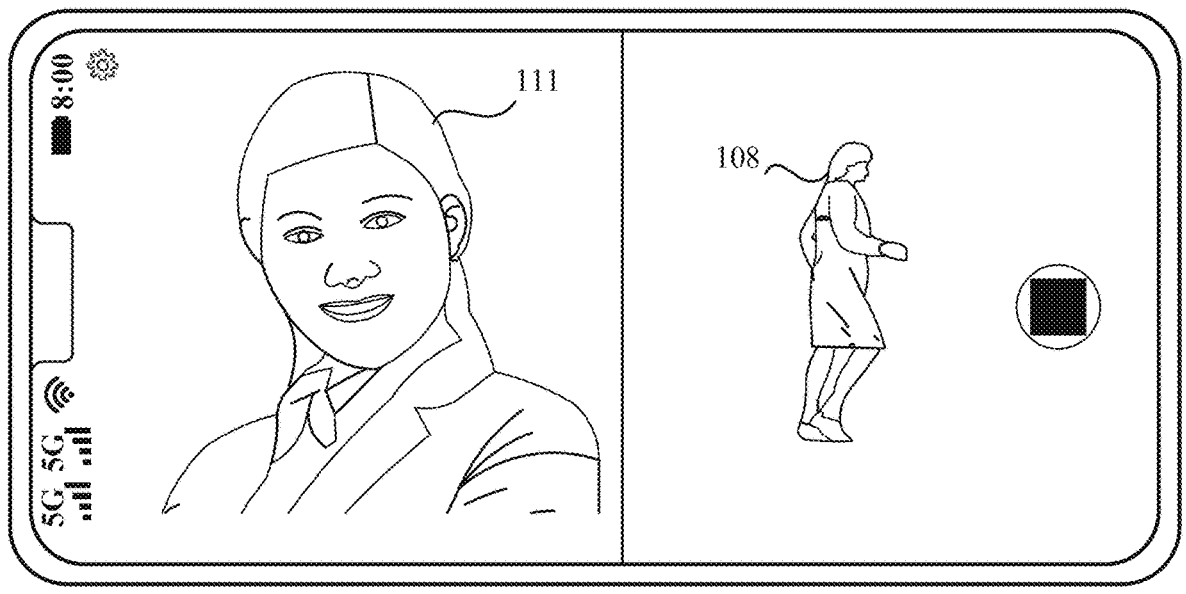

FIG. 1F is a schematic diagram in which the user performs dual-view recording by using the rear-facing wide-angle camera and the front-facing camera in the wide-angle mode+the front-facing mode. After the user taps the recording control 107, dual-view recording starts. The recording control 107 may change a shape to indicate a change of a recording status. For example, after the user taps the recording control 107, a circular countdown may be displayed. For example, a preset time period such as 10 seconds, 5 seconds, or 8 seconds may be set. After the preset time period expires, dual-view recording is completed. When the user wants to end dual-view recording, the user may tap the recording control 107 to end video recording. In this mode, the image content 108 collected by the wide-angle camera and the image content 111 collected by the front-facing camera are included. When the user wants to end dual-view recording, the user taps the recording control 107 again to end video recording. If the user wants to change the shooting mode, the user taps the setting control 105 to pop up the function box 106, and the user may select the shooting mode again in the function box 106.

Figure 1G:
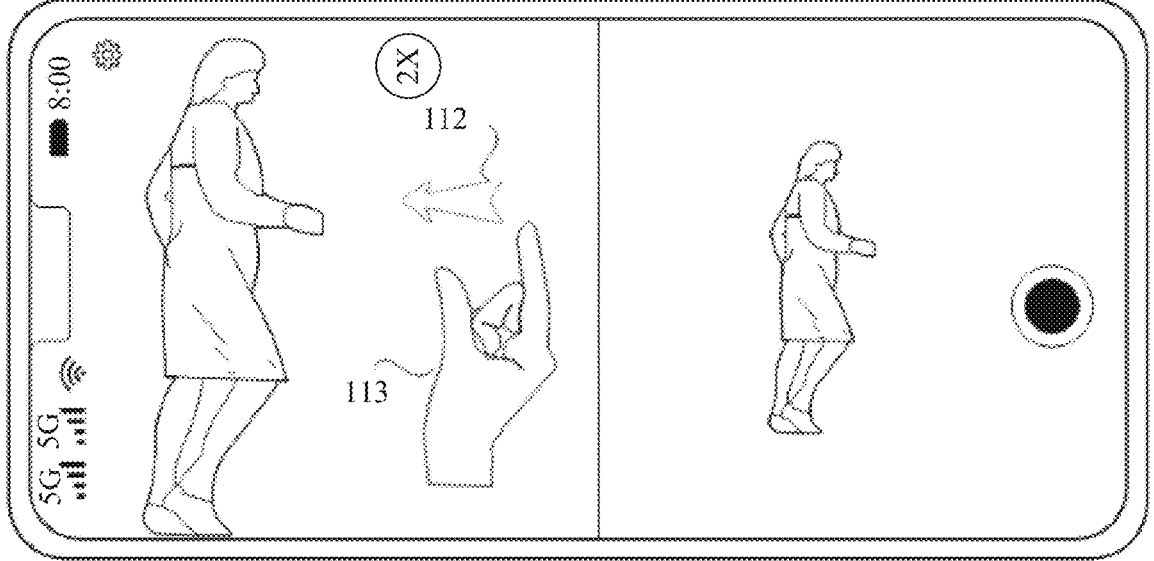

FIG. 1G is a schematic diagram in which the user performs dual-view recording by using the rear-facing wide-angle camera and the rear-facing zoom camera in the wide-angle mode+the zoom mode. A gesture 113 is a zoom gesture of the user. In a process of performing dual-view recording, when the user uses the gesture 113, a video image is zoomed in, and a camera corresponding to the video image changes a focal length. For example, if the gesture 113 is a zoom-in gesture, the camera corresponding to the video image increases the focal length, and the video image is zoomed in. Similarly, if the gesture 113 is a zoom-out gesture, the camera corresponding to the video image decreases the focal length, and the video image is zoomed out. When the user uses the gesture 113, a control 112 may be further displayed in the video image. The control 112 may be a control indicating audio zoom. If the gesture 113 is the zoom-in gesture, the control 112 generates a change such as a darker color or a larger shape, and corresponding enhancement processing is performed on audio corresponding to the video image. Similarly, if the gesture 113 is the zoom-out gesture, the control 112 generates a change such as a lighter color or a smaller shape, and corresponding weakening processing is performed on the audio corresponding to the video image. The foregoing processing such as audio enhancement and weakening.

It may be understood that, when the user selects the dual-view function to enter the dual-view preview interface, after the user inputs "record" or "start recording" through a voice, the mobile phone may perform video recording; and after the user inputs "stop" or "stop recording" through a voice, the mobile phone completes dual-view video recording.

When dual-view recording is performed, an audio signal may be collected by using a microphone. A pickup device used by the electronic device may be a microphone array (Microphone array). The microphone array may be an array formed by a group of omnidirectional microphones that are located at different locations in space and arranged based on a specific shape rule, and is an apparatus for performing spatial sampling on a spatially propagated sound signal. The signal collected by the microphone array includes spatial location information of a sound source. The microphone array may be used for voice quality enhancement, sound source localization, sound source signal extraction and separation, and the like. The voice quality enhancement indicates a process of extracting a pure voice from a voice signal containing noises after the voice signal is interfered or even submerged by the various noises (including a voice). Because a location of the sound source constantly changes, the microphone array may perform sound source localization. The sound source localization indicates that the microphone array is used to calculate an angle and a distance of a target sound source, to implement directional pickup of a sound source voice. The microphone array may further perform sound source signal extraction, and the sound source signal extraction is to extract a target signal from a plurality of sound signals. A main manner of performing signal extraction by using the microphone array is as follows: According to a beamforming method, for example, sound pickup beams are separately formed by using sound sources in different propagation directions, and a sound in another direction other than a target direction is suppressed, to perform voice extraction. The microphone array may further perform sound source signal separation, and the sound source signal separation is to separate and extract a plurality of mixed sounds according to a requirement. A main manner of performing signal separation by using the microphone array is performed according to a conventional blind source separation (blind source separation) method, and mainly includes a principal component analysis (principal component analysis, PCA) method and an independent component analysis (independent component analysis, ICA) method. The microphone array used in this embodiment may use omnidirectional microphones. The omnidirectional microphone may receive a sound from any direction. For example, all sound signals may be picked up in a same manner regardless of a sound source at any angle. It may be understood that another microphone, such as a unidirectional microphone, a bidirectional microphone, or a heart-shaped microphone, may be alternatively used. This is not limited in this embodiment of this application.

Figure 4:
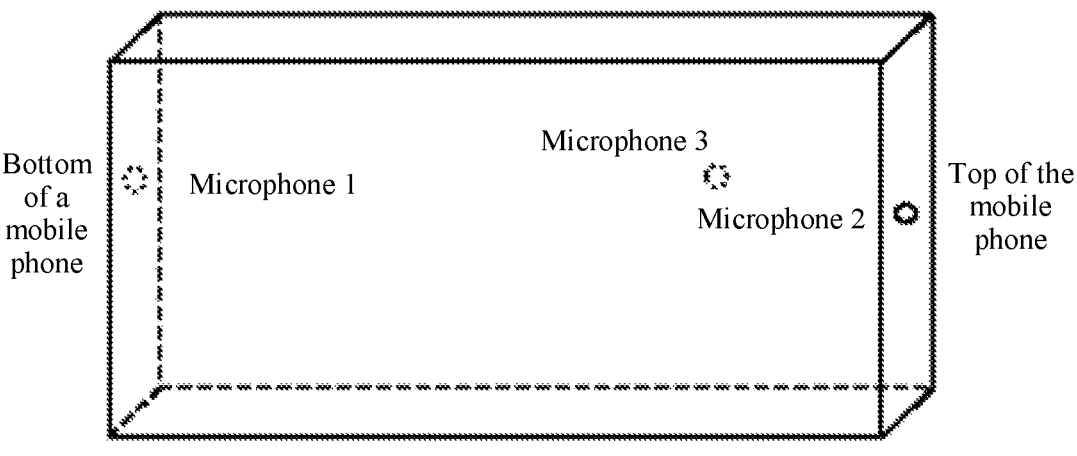
FIG. 4 shows a microphone distribution manner of an electronic device according to an embodiment of this application.

In this embodiment, the omnidirectional microphone may further extract, separate, and enhance a sound signal of a target sound source based on a zoom operation performed by the user on the image content. For example, the mobile phone 100 may implement audio zooming based on image content zooming. There may be a plurality of microphones in this embodiment of this application. The following uses three microphones as an example for description. As shown in FIG. 4, the mobile phone 100 has three omnidirectional microphones: a top microphone 1, a bottom microphone 2, and a back microphone 3 of the electronic device. When dual-view recording is performed, all the three microphones may collect sound signals, and separately perform audio signal processing on the collected sound signals based on two images in the dual-view mode. A signal processing process includes: First, wind noise reduction (wind noise reduction, WNR) is performed on the sound signals collected by the three microphones. A wind noise may be a fixed noise generated by wind, for example, a steady-state noise. The wind noise may alternatively be composed of a noise that varies with wind strength, for example, an unsteady-state noise. The steady-state noise may be determined by an average value when there is no voice in an input signal collected by the microphone, and the unsteady-state noise may be determined by a difference between the input signal and the steady-state noise. The electronic device may perform noise reduction processing on the wind noise based on different types of input signals. In the second step, after wind noise processing is performed, beamforming (Beamforming) processing is performed on processed audio data. Beamforming is to perform delay or phase compensation and signal amplitude weighting processing on a signal input by each microphone, to form a beam pointing to a specific direction. There may be two beamforming solutions used in this embodiment. One is fixed beamforming, and the other is adaptive beamforming. The two solutions may be used separately or jointly. For example, the two solutions of fixed beamforming and adaptive beamforming are used together to process a sound signal when the front-facing camera is used for recording. For example, in the dual-view mode, a mode including the front-facing camera is used, and a solution in which fixed beamforming and adaptive beamforming are jointly used is used when an audio signal corresponding to the front-facing camera is processed. The solution of adaptive beamforming may be used in a mode including the rear-facing camera (for example, the rear-facing wide-angle camera or the rear-facing zoom camera).

For fixed beamforming, a delay-sum method may be used to well process an incoherent noise, such as a spatial white noise. For adaptive beamforming, a minimum variance distortionless response (minimum variance distortionless response, MVDR) method may be used. An MVDR is an adaptive beamforming algorithm based on a maximum signal-to-noise ratio criterion, and can minimize a variance of a recorded signal and find a sum of a minimized signal and noise, thereby mitigating noise impact. After adaptive beamforming processing is performed, beam post-processing may be further performed. Beam post-processing indicates that some sounds of a sound signal obtained after adaptive beamforming are distorted at an edge of a beam, and some sounds are attenuated (this problem does not occur in fixed beamforming), for example, a treble voice is attenuated or is easily lost. Beam post-processing detects the attenuated or lost part of the sound signal, and supplements the part to the sound signal. In the third step, equalization (equalizer, EQ) processing is performed on the sound signal on which the foregoing processing is performed, for example, adjusting a gain of a sound signal of each frequency band in the audio signal. In the fourth step, automatic gain control (automatic gain control, AGC) processing is performed on the sound signal on which EQ processing is performed. AGC is a closed-loop feedback adjustment circuit in an amplifier or an amplifier chain. A function of the AGC is to: regardless of how an amplitude of an input signal changes, maintain a proper signal amplitude when the signal is output after AGC processing. For example, smoothing processing is performed on an audio signal, so that the audio signal is kept in a proper range. In the fifth step, after AGC processing is performed on the audio signal, auto-regressive (auto-regressive, AR) model coefficients of a sound and a noise are estimated by using a deep neural network (deep neural network, DNN). In a training phase, a training feature of the DNN is a log power spectrum (log power spectrum, LPS), and a training target is a cascaded vector of an AR model system of the sound and the noise. By training the DNN, a fitting function between the LPS of the voice and the AR model coefficient of the enhanced voice and noise is obtained. A Wiener filter is constructed by using the AR model coefficients of the voice and the noise output by the DNN, to realize voice quality enhancement. A function of DNN harmonic enhancement is to improve hearing. In the mode in which the front-facing camera is included, when a proportion of a human voice in an audio signal is large, an enhanced DNN harmonic can better improve hearing. A harmonic is an electricity quantity that is included in a current and whose frequency is an integer multiple of a fundamental wave. In other words, after Fourier series decomposition is performed on a periodic non-sinusoidal electricity quantity, except an electricity quantity of the fundamental wave frequency, an electricity quantity generated by another current greater than the fundamental wave frequency is referred to as the harmonic. A harmonic whose frequency is an even multiple of a fundamental wave can better improve hearing. Therefore, DNN harmonic enhancement can control the harmonic to achieve an effect of improving hearing. After DNN harmonic enhancement, record noise reduction (record noise reduction, RNR) is performed on the processed signal to remove an external noise and retain a scenario in which the audio is input. In the sixth step, the electronic device performs multiband dynamic range control (multiband dynamic range control, MBDRC) on the audio signal obtained through RNR noise reduction processing. Dynamic range control is to dynamically adjust an output amplitude value of the audio signal and control a contrast. When volume is high, the volume is suppressed within a specific range. When the volume is low, the volume is increased properly. The audio signal is divided into a plurality of frequency bands. Different adjustment manners may be set for different frequency bands to control audio output power. In this way, the speaker does not break a voice and the voice can be clearly heard when the volume is low. In the seventh step, the electronic device performs peak value limiting on the audio signal obtained after MBDRC processing, and outputs a final audio signal.

It may be understood that zoom information of the image content in the dual-view mode, for example, the zoom multiple, may be added to processing of the sound signal through beamforming, to obtain a sound zoom effect. Some steps in the foregoing steps may be omitted, for example, the third step or the fifth step. The sequence of the foregoing steps may also be changed, for example, the fourth step and the sixth step.

Figure 2A:
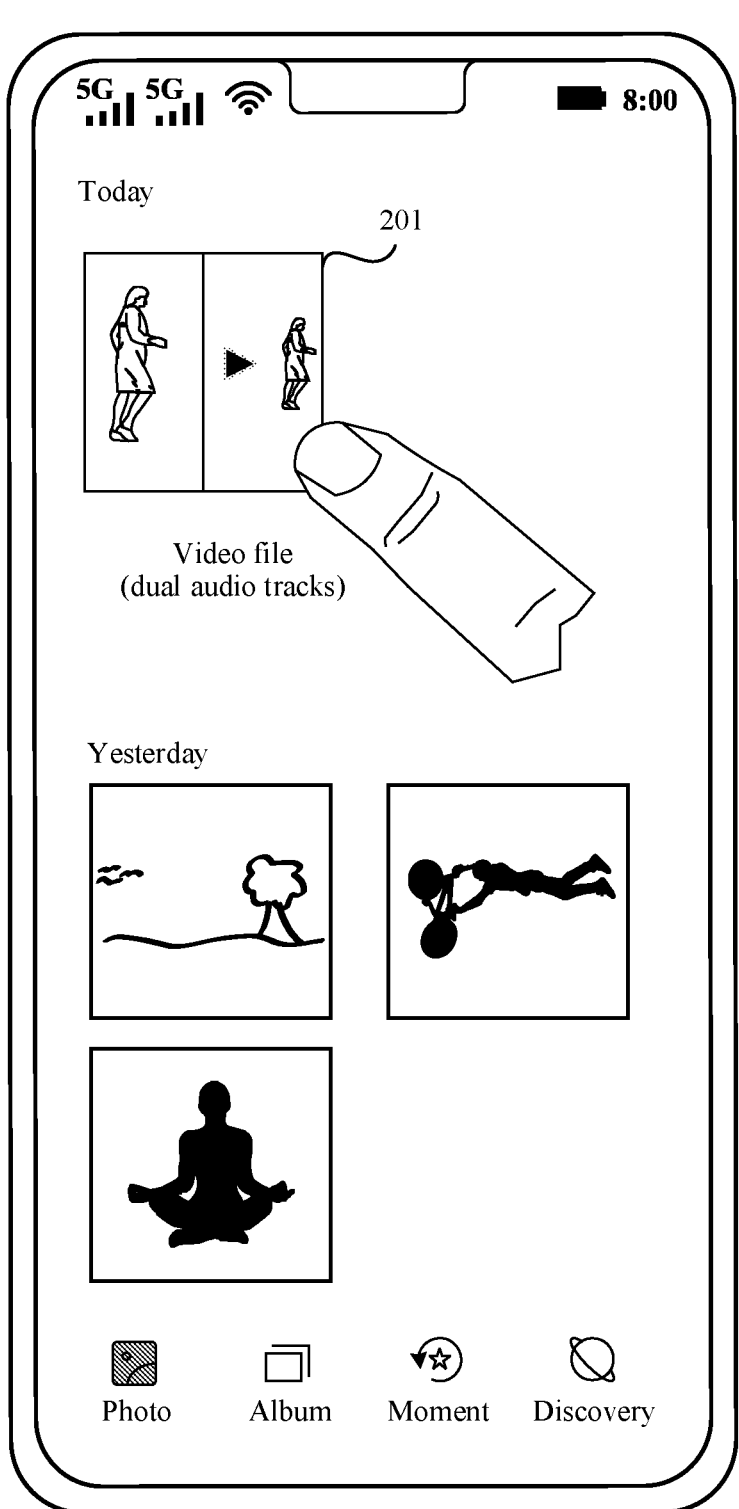
FIG. 2A to FIG. 2D show different methods for storing a video in a dual-view mode according to an embodiment of this application.

After dual-view recording ends, a multimedia file may be stored in a plurality of manners. As shown in FIG. 2A, a video file with dual audio tracks may be stored. Audio signals corresponding to different images are separately coded to generate two audio tracks, and then the audio tracks are coded into corresponding video files. For example, an audio signal corresponding to the image content 109 in two pieces of image content during dual-view recording is coded to generate an audio track 1, and an audio signal corresponding to the image content 108 in the two pieces of image content during dual-view recording is coded to generate an audio track 2. The mobile phone 100 may code the audio track 1 and the audio track 2 into the video file by using an audio and video hybrid coding API. A beneficial effect of the foregoing file storage method is as follows: A video recorded in the dual-view mode may have only one video file, and occupied storage space is small. In addition, the video file has good compatibility and can adapt to most mainstream video playing applications in the market.

The audio track may be a set of sound channels, that is, one audio track may have a plurality of sound channels, and one audio track may be a piece of complete audio data. One video file may have a plurality of audio tracks, and each audio track may have a plurality of sound channels. A sound channel may be a separate channel of a sound effect. Different sound channels may have audio signals with a same waveform but different phases, or may have audio signals with different waveforms.

Figure 2B:
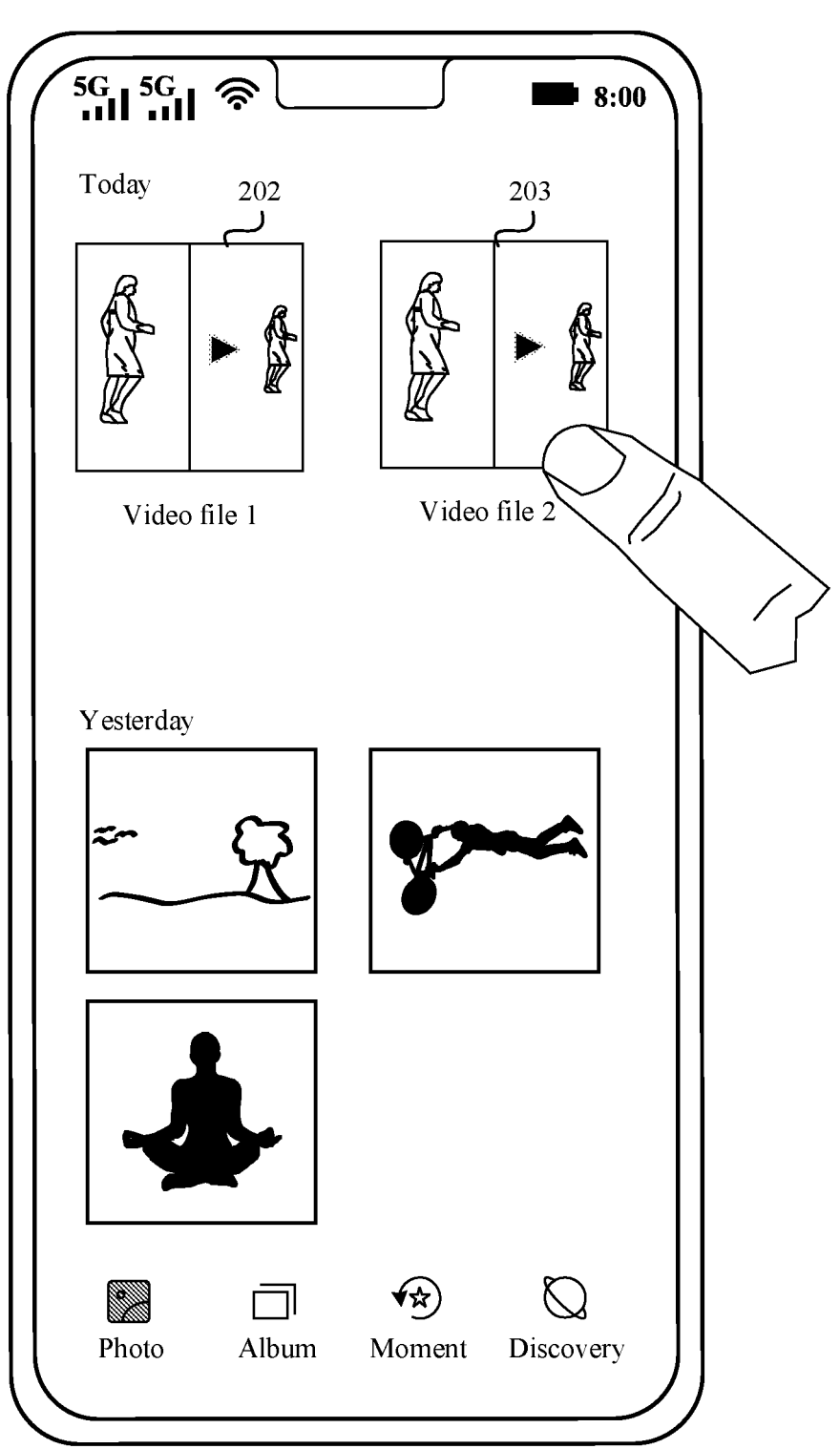

It may be understood that, in some possible implementations, after dual-view recording ends, the manner of storing the multimedia file may alternatively be a manner shown in FIG. 2B in which two video files may be stored. Video data of the two video files may be the same, and both have content of two images. Two pieces of audio data may also be generated. One piece of audio data corresponds to an audio signal of one piece of image content of the two pieces of image content, and the other piece of audio data corresponds to an audio signal of the other piece of image content of the two pieces of image content. The audio data and the video data are coded together to generate a video file, that is, two video files are separately generated. As shown in FIG. 2B, a video file 202 and a video file 203 are generated during dual-view recording. Audio of the video file 202 corresponds to the audio signal of the image content 109, and the video file 203 corresponds to the audio signal of the image content 108. However, video content of both the video file 202 and the video file 203 is a combination of the image content 108 and the image content 109. A beneficial effect of the foregoing file storage method is as follows: When sharing a video file, the user may select a video file of audio corresponding to an image for sharing, thereby improving convenience, and a shared user does not need to select the audio again.

In some other possible implementations, after dual-view recording ends, the manner of storing the multimedia file may alternatively be a manner shown in 2C in which a video file 204 and an audio file 205 may be stored. Audio of the video file 204 corresponds to the audio signal of the image content 109, and audio of the audio file 205 corresponds to the audio signal of the image content 108. A beneficial effect of the foregoing file storage method as follows: A specific player can be bound, so that a video file and an audio file can be conveniently played at the same time.

Figure 2C:
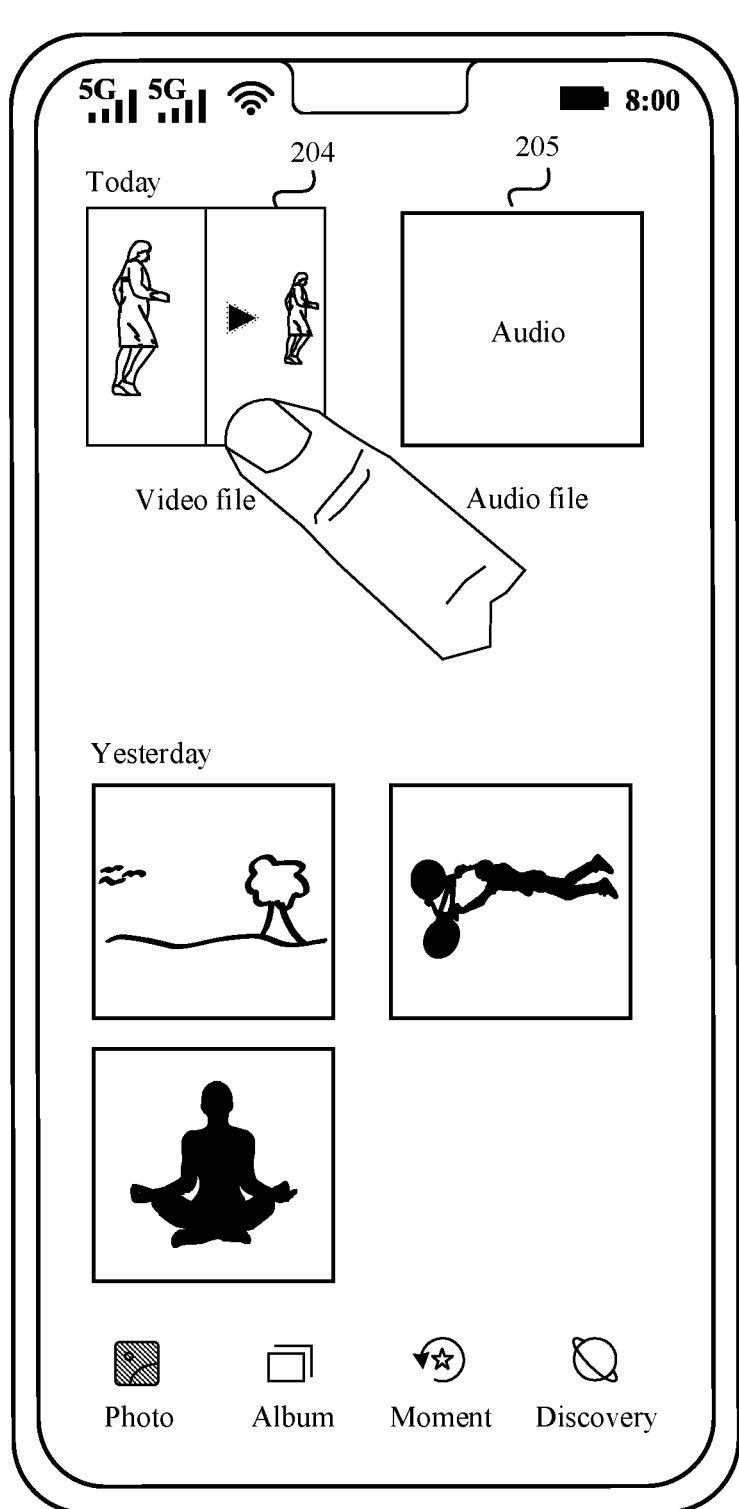
Figure 2D:
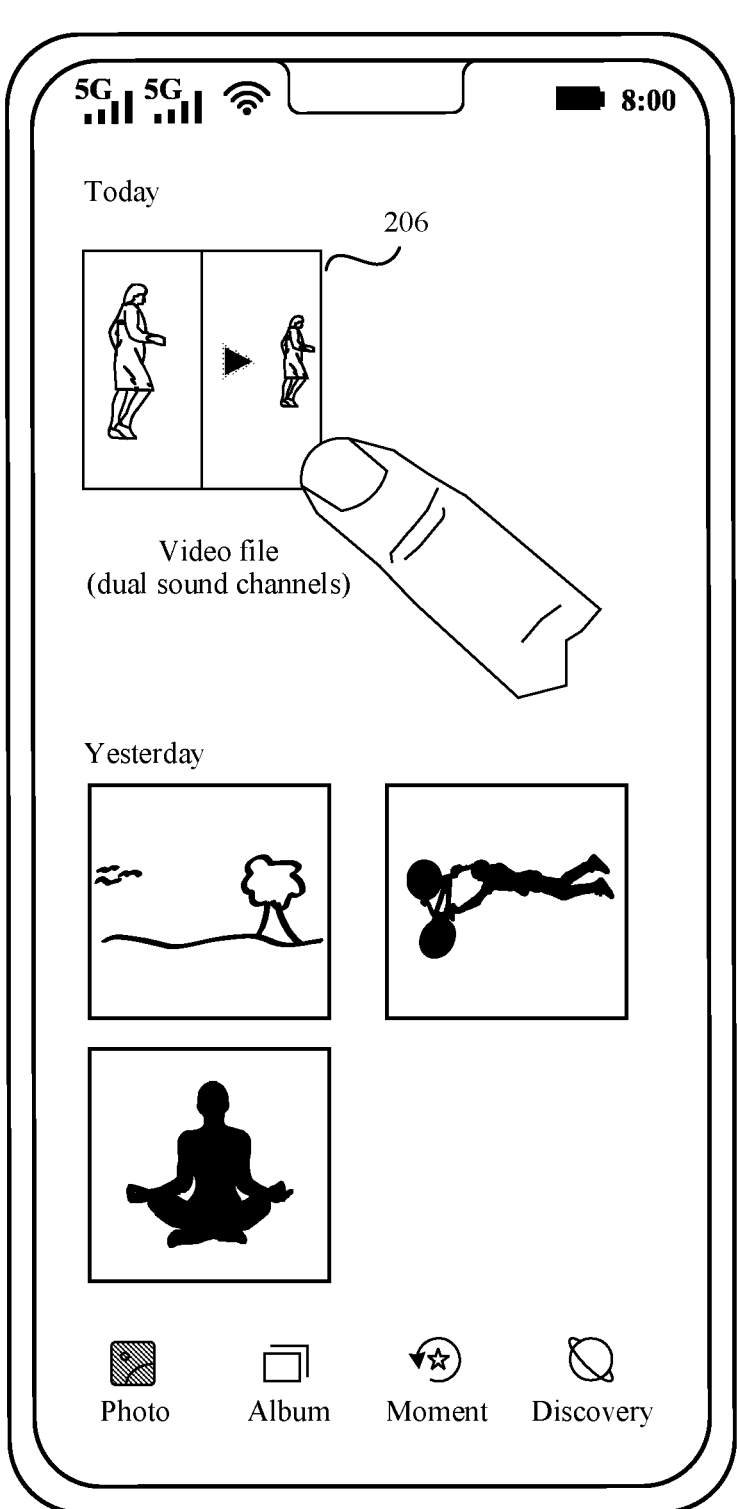

In some other possible implementations, after dual-view video recording ends, the manner of storing the multimedia file may alternatively be a manner shown in FIG. 2D in which a video file 206 may be stored and the video file 206 has two sound channels. Audio signals corresponding to different image content are coded into different sound channels of the video file. For example, content of a left sound channel of the video file 206 is the audio signal corresponding to the image content 109, and content of a right sound channel of the video file 206 is the audio signal corresponding to the image content 108. A beneficial effect of the foregoing file storage method is as follows: Because a new video file does not change an architecture of an original video file, a workload of a software developer in a development process can be reduced.

Figure 3A:
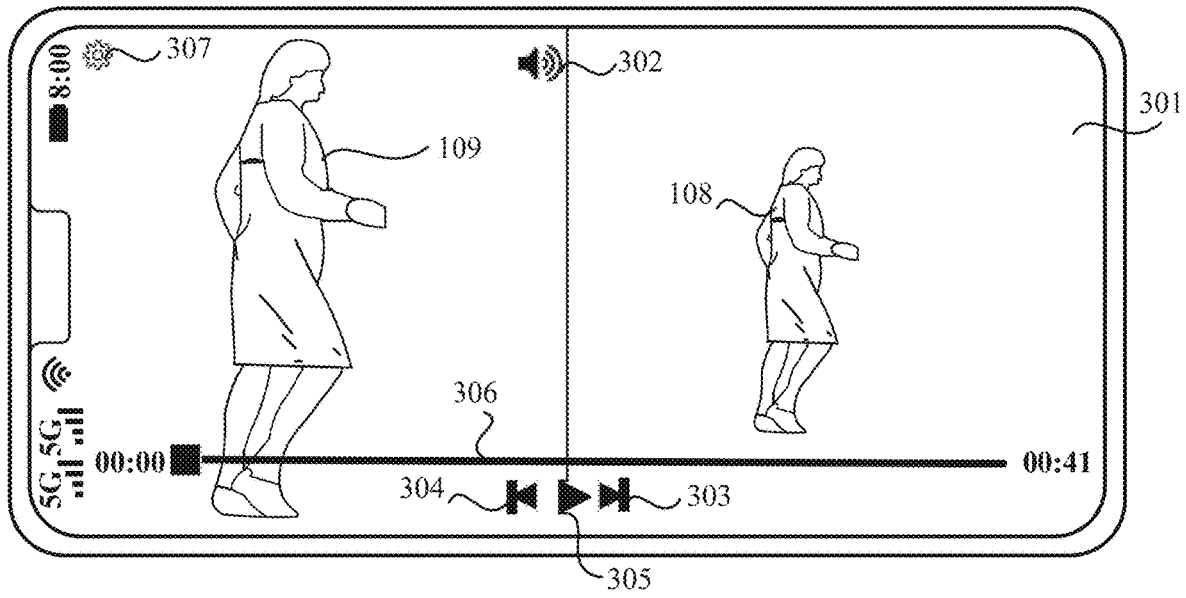
FIG. 3A to FIG. 3D show different operation interfaces of a video playing application according to an embodiment of this application.
Figure 3B:
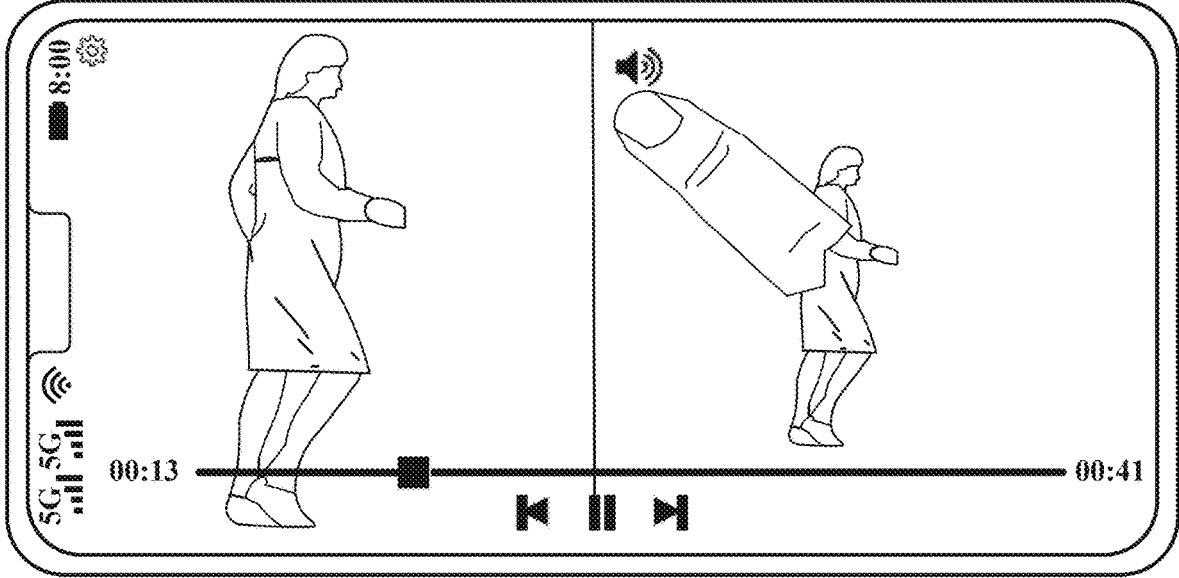
Figure 3C:
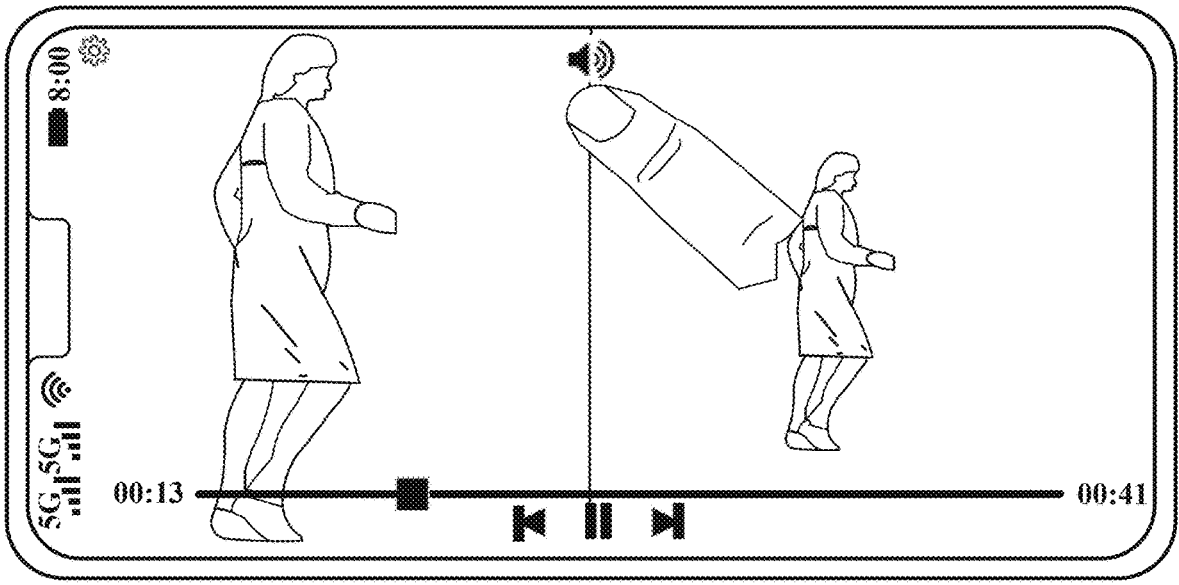

When the user plays back the video file recorded in the dual-view mode, as shown in FIG. 2A, after the user taps the video file 201, an interface shown in FIG. 3A appears. The interface includes a video playing interface 301. The video playing interface 301 is divided into two parts. One part is the image content 108, and the other part is the image content 109. The video playing interface 301 further includes a play control 302 (for example, the play control 302 is an audio play control). As shown in FIG. 3A, the play control 302 is in a horn shape. It may be understood that the play control 302 may alternatively be in another shape. This is not limited in this embodiment of this application. In FIG. 3A to FIG. 3C, the horn shape is used as an example. When the user taps the play control 302, audio corresponding to the image content is played. The video playing interface 301 further includes a progress bar 306, to indicate video playing progress. The video playing interface 301 further includes a play/pause control 305. When the user taps the control, playing and pausing of the video may be controlled. The video playing interface 301 further includes a fast-forward control 303 and a rewind control 304, so that video playing progress may be controlled. When the video playing interface 301 is displayed, the play control 302 may be in a left image of the video playing interface 301 by default. If the user taps the play/pause control 305, the mobile phone 100 starts to play the video, and plays the audio of the left image by default, that is, audio corresponding to the image content 109. Certainly, it may be understood that the play control 302 may alternatively be in the middle or on the right of the video playing interface 301 by default. The play control 302 may be further dragged or tapped by the user. When the user drags the play control 302 to the right of the video playing interface 301 shown in FIG. 3B, the mobile phone 100 plays audio corresponding to the image content 108. When the user drags the play control 302 to the middle of the video playing interface 301 shown in FIG. 3C, the mobile phone 100 plays audio obtained after superimposition processing is performed on the audio corresponding to the image content

Figure 3D:
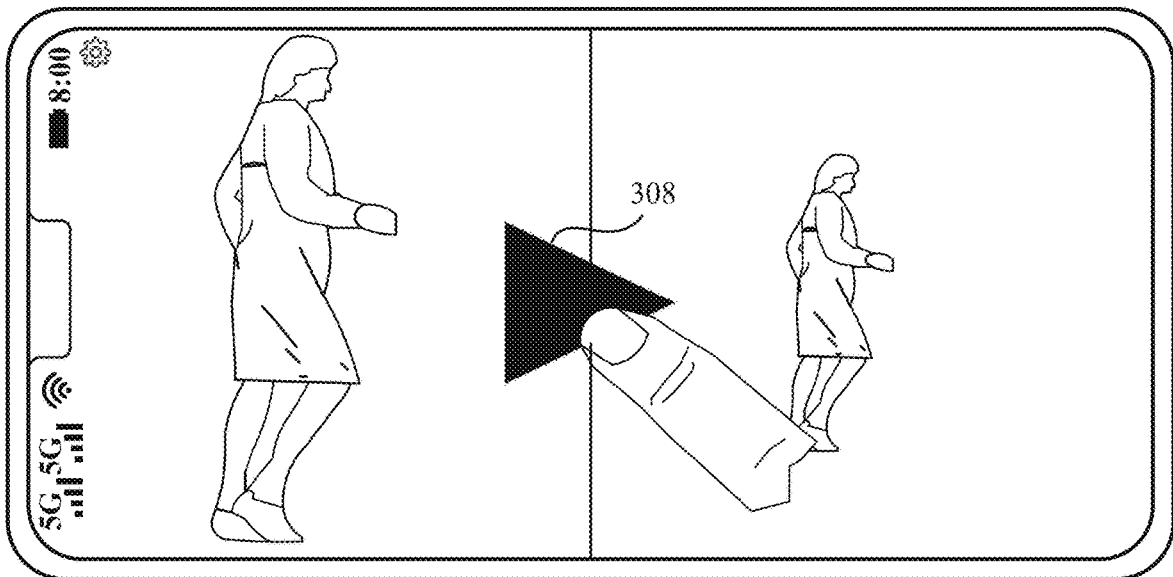

108 and the image content 109. Alternatively, the user may tap the play control 302. When the user taps the play control 302, the mobile phone 100 plays a sound or mutes, and the sound played by the mobile phone 100 is audio corresponding to an image at a location of the play control 302. As shown in FIG. 3D, the video playing interface may further include a play control 308. When the user taps the play control 308, the video starts to be played. It may be understood that the user may further play the video by using a voice instruction or a voice assistant. For example, the user sends a voice instruction "play the video 201" to the mobile phone, and then the video playing application starts to play the video 201. A play control may not be required when the video is played by using the voice instruction or the voice assistant, or the play control may continue to be retained on the video playing interface. This is not limited in this embodiment. For example, when the user sends the voice instruction "play the video 201" to the mobile phone, the play control starts to play the video in response to the voice instruction.

In another embodiment, the electronic device may further support a three-view mode. In the three-view mode, the electronic device may record three channels of video images during recording, and display three images on the display of the electronic device. The three images may be from images collected by three different cameras.

The camera may include but is not limited to a rear-facing wide-angle camera, a rear-facing zoom camera, a rear-facing long-focus camera, a rear-facing fixed-focus camera, a front-facing fixed-focus camera, a front-facing zoom camera, a front-facing long-focus camera, and the like. The user may separately zoom in or out on the three images, or zoom in or out on only one of the three images, or zoom in or out on only two of the three images. When the user performs the zoom operation on the image, a focal length of the camera may be changed. When the camera zooms, the zooming may be optical zooming or digital zooming. The three images may be arranged side by side on the preview interface, or may be displayed on the preview interface in any display ratio. The three images may be displayed in a splicing mode or a picture-in-picture mode.

Figure 5:
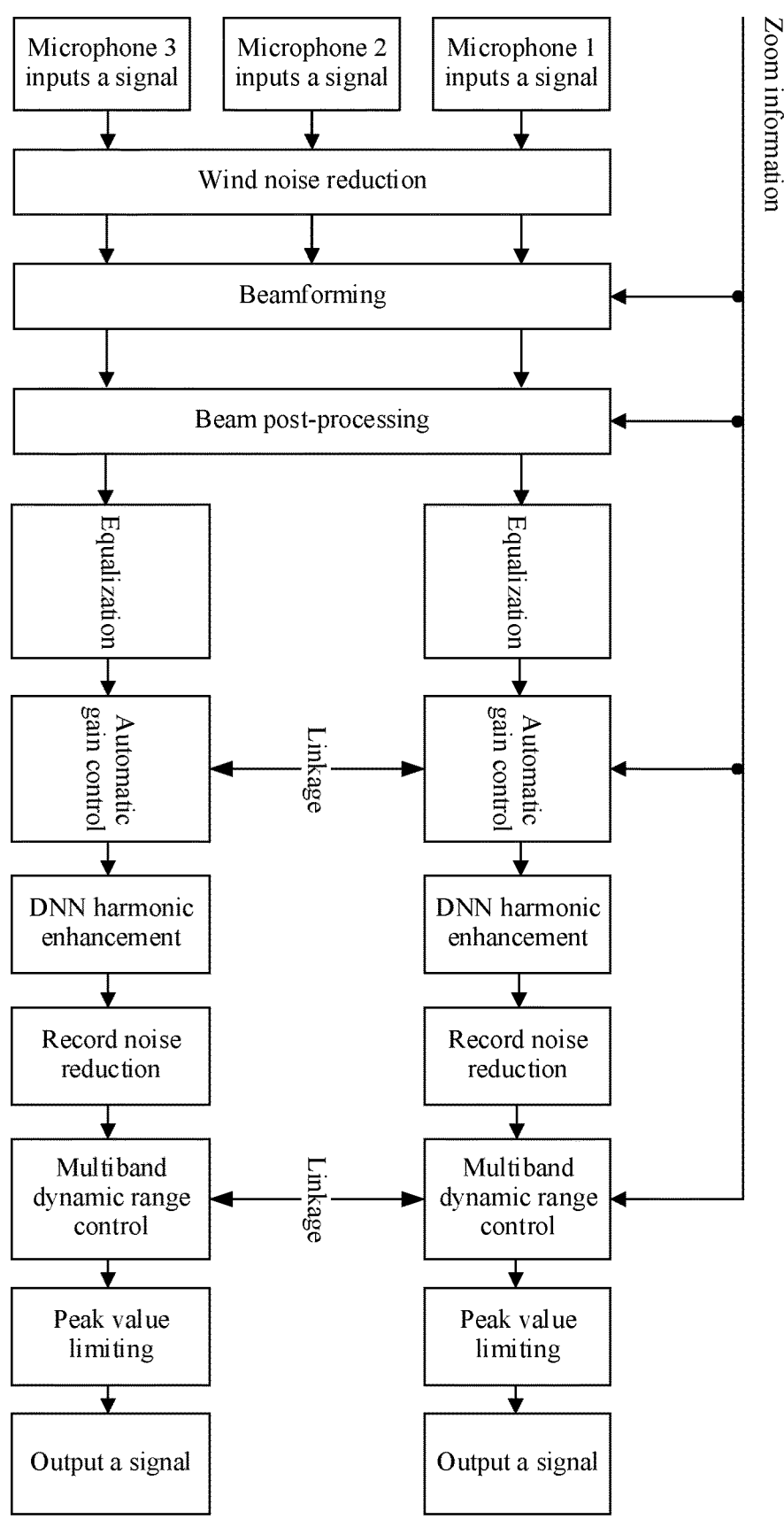
FIG. 5 shows an audio data processing method according to an embodiment of this application.

In the foregoing plurality of embodiments, when the user performs recording by using a multi-view mode including dual views, and a zoom camera that includes but is not limited to a rear-facing zoom camera, a front-facing zoom camera, and the like is used, zoom operation information of the user or zooming information of a recorded video image may be added to an audio signal processing algorithm. As shown in FIG. 5, first, wind noise suppression processing is performed on audio signals input by three channels of microphones. In the second step, beamforming processing is performed on the audio signals on which wind noise suppression processing is performed, and the zoom information is added to a beamforming calculation process. The zoom information may be a fixed value, or may be a value that changes at any time. For example, as an amplification value increases, a formed beam may gradually narrow, and a beamforming algorithm may suppress sounds in more directions, to improve a signal-to-noise ratio of a sound in a target direction. After beamforming processing, the three channels of audio signals are output as two channels of audio signals. In the third step, during beamforming processing, signals at edges of some beams are attenuated. Therefore, beam postprocessing is performed on the attenuated signals, the foregoing amplification information is added to beam postprocessing, and a corresponding target direction is amplification based on an image, to compensate for the corresponding attenuated audio signal in the target direction. In the fourth step, equalization processing is performed on the audio signal obtained through beam processing. In the fifth step, after equalization processing, the amplification information is added to automatic gain control processing, corresponding smoothing processing is performed based on the amplified target direction, and same automatic gain control processing is performed on the two channels of audio signals to ensure that smoothness of the two channels of output signals is the same. In the sixth step, DNN harmonic enhancement processing is performed on the two channels of audio signals obtained through automatic gain control processing. In the seventh step, after DNN harmonic enhancement processing, noise reduction processing is performed on the two channels of audio signals. In the eighth step, after noise reduction processing, multiband dynamic range control processing is performed on the two channels of audio signals, the amplification information is added to multiband dynamic range control processing, and multiband dynamic range control processing is performed on the two channel audio signals. In the ninth step, peak value limiting is performed on the two channels of audio signals obtained through multiband dynamic range control processing. For example, the audio signal cannot exceed 50 dB. Then, the two channels of audio signals obtained through peak value limiting are respectively output as a left sound channel and a right sound channel.

Figure 6:
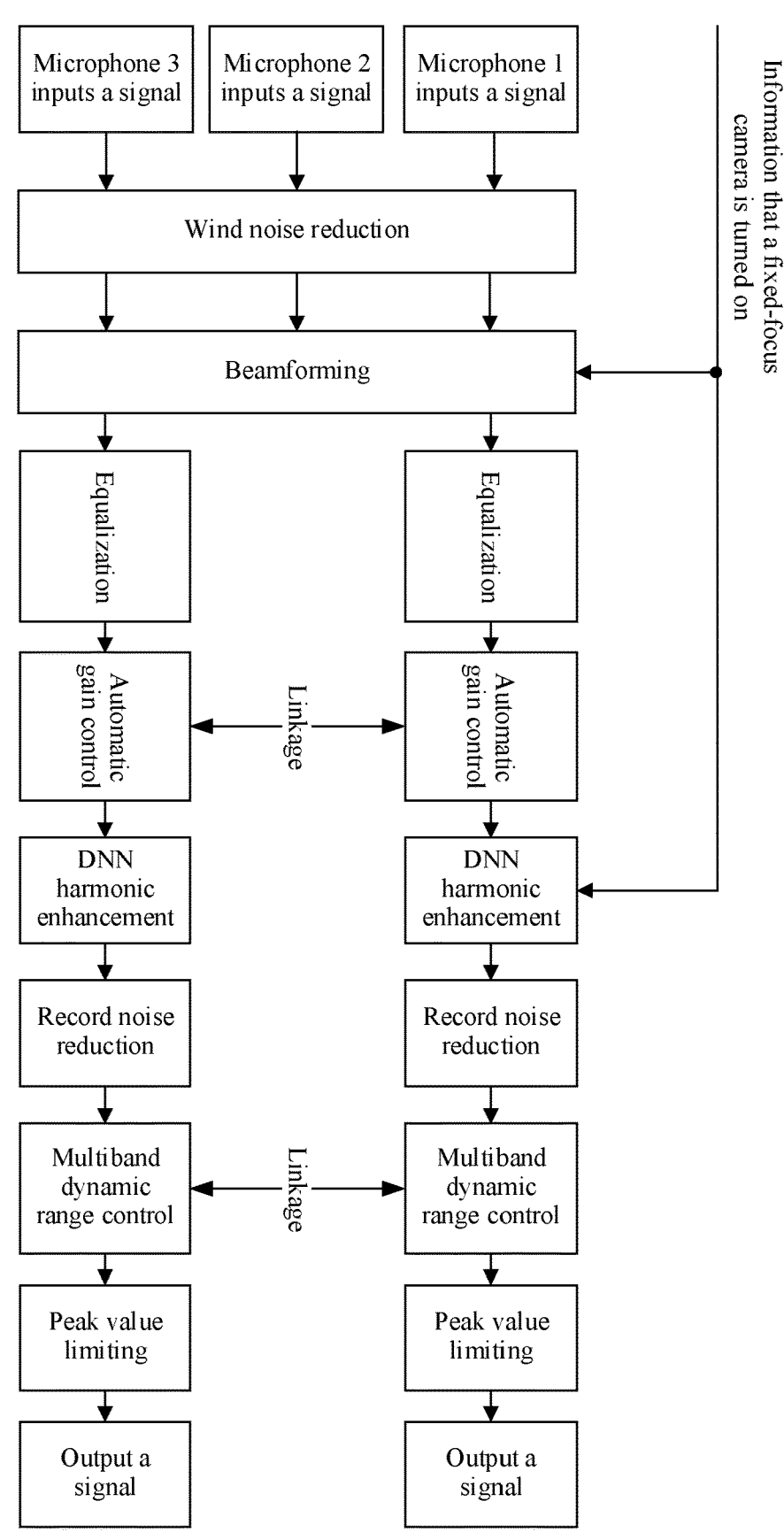
FIG. 6 shows another audio data processing method according to an embodiment of this application.

In the foregoing plurality of embodiments, when the user performs recording by using the multi-view mode including dual views, and a fixed-focus camera that includes but is not limited to a rear-facing fixed-focus camera, a front-facing fixed-focus camera, and the like is used, information that the fixed-focus camera is turned on by the user may be added to the audio signal processing algorithm. As shown in FIG. 6, for example, the fixed beamforming solution and the adaptive beamforming solution are used in a front-facing shooting direction, to improve an enhancement amplitude of an audio signal in a target direction, and suppress a noise in a non-target direction. This solution may also be referred to as focusing. Focus processing may further use DNN harmonic enhancement to further improve loudness and clarity of a user sound. First, during recording of the front-facing camera, wind noise suppression processing is first performed on three channels of input audio signals collected by three microphones. In the second step, fixed beamforming processing is performed on the three channels of audio signals obtained through wind noise suppression processing, and two channels of audio signals are output. In the third step, equalization processing is performed on the two channels of output audio signals. In the fourth step, same automatic gain control processing is performed on the two channels of audio signals obtained through equalization processing. In the fifth step, DNN harmonic enhancement is performed on the two channels of audio signals obtained through automatic gain control processing, and information that the front-facing camera starts recording is added to DNN harmonic enhancement processing. During DNN harmonic enhancement, corresponding processing may be performed based on the front-facing camera, and an audio signal with higher loudness and clarity of the user sound is output. In the sixth step, noise reduction processing is performed on the two channels of audio signals obtained through DNN harmonic enhancement. In the seventh step, same multiband dynamic range control processing is performed on the audio signals obtained through noise reduction processing. In the eighth step, peak value limiting is performed on the two channels of audio signals obtained through multiband dynamic range control processing. Finally, the two channels of audio signals are respectively output as a left sound channel and a right sound channel.

After the foregoing processing on the audio signal, the audio signal changes. If the audio signal is amplified, clarity of the audio signal can be improved, and a sound pickup distance can be increased to some extent. In the foregoing processing, a sound of a sound source in the target direction is increased, and a sound in another direction except the target direction is suppressed. Therefore, the clarity of the audio signal is improved. In addition, as clarity of the sound source in the target direction increases, the user can hear a sound at a longer distance. This is equivalent to amplifying the audio signal. Therefore, the sound pickup distance is increased. An experiment shows that the sound pickup distance is significantly improved in a long-distance recording scenario. For example, in scenarios such as entertainment shooting and classroom recording, the sound pickup distance of the sound source can be increased by more than three times. In terms of improving the clarity of the audio signal, a sound pickup effect is more obvious in a noisy environment, such as outdoor street snapping, a small concert, and a shopping mall. Based on the experimental data, audio signal amplification processing can make a maximum suppression value of the audio signal in the non-target direction greater than or equal to 10 dB. A signal-to-noise ratio of the sound source in the target direction increases, and sound pickup clarity is improved. If the audio signal is focused, the loudness and clarity of the sound source in the target direction can be improved.

In the foregoing embodiment, the method for coding the audio signal may use a corresponding recording application processing interface (application programming interface, API). A sampling rate, a sampling channel, a data format, and the like of an audio signal may be preset in the recording API. Algorithm processing may be performed on a sampled audio signal, and audio data obtained through algorithm processing may be coded and decoded by using a multimedia codec (media codec). Coding may be performed based on different audio coding formats, including but not limited to, for example, advanced audio coding (advanced audio coding, AAC), moving picture experts group-1 or moving picture experts group-2 audio layer III (MPEG-1 or MPEG-2 Audio Layer III, MP3), and waveform audio file format (waveform audio file format, WAV). The recording API can be used to code a sound channel and an audio track. A video coding manner is basically the same as the audio coding manner. The recording API can be used to preset a coding type, baud rate, frame rate, and key frame. An audio and video mixing API may be used to perform mixed coding of audio and a video, to obtain a video file of a mixed audio signal and a mixed video signal. In a process of mixed coding of an audio signal and a video signal, there may be a plurality of audio tracks. Specifically, for example, audio signals corresponding to the foregoing different images may be coded into a plurality of audio tracks. When a video playing application plays a video file, the video file is decoded to restore the video to a video stream and an audio stream that are suitable for playing.

Figure 7A:
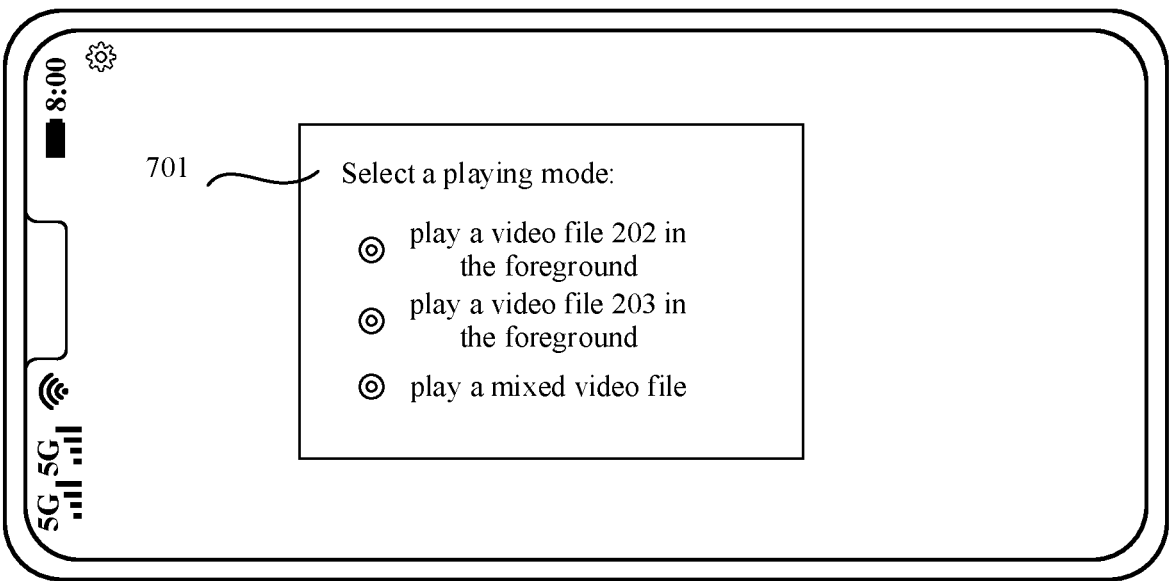
FIG. 7A to FIG. 7C show different playing mode selection methods according to an embodiment of this application.

There may be a plurality of manners for playing back a video file generated by dual-view recording. In the foregoing embodiment, if a multimedia file storage manner is dual video files shown in FIG. 2B, a video playing application of the mobile phone 100 may play two video files at the same time. For example, the video playing application may decode the video file 202 and the video file 203 at the same time. In a video playing process, the mobile phone 100 displays the interface shown in FIG. 3A, and there is a setting control 307 in the video playing interface 301. The user may tap the setting control 307, and an interface shown in FIG. 7A is displayed on the mobile phone 100. There is a selection box 701 in the interface shown in FIG. 7A, and in the selection box 701, "play the video file 202 in the foreground", "play the video file 203 in the foreground", or "play a mixed video file" may be selected. If the user selects to play the video file 203 in the foreground, the mobile phone 100 plays the video file 203. Similarly, the user may alternatively select to play the video file 202. If the user selects to play the mixed video file, the video playing application performs hybrid coding on the video file 202 and the video file 203, and then decodes and plays the video file 202 and the video file 203. The hybrid coding is performing hybrid coding on audio data of the two video files. It may be understood that, in some cases, the user does not need to perform manual selection. When the user drags the play control 302 in the interface shown in FIG. 3A, the video playing application automatically selects a corresponding video file for foreground playing. If the play control 302 is on the left of the video interface 301, the video playing application plays the video file 202 in the foreground. If the play control 302 is on the right of the video interface 301, the video playing application plays the video file 203 in the foreground. If the play control 302 is in the middle of the video interface 301, the mixed video file is played.

Figure 7B:
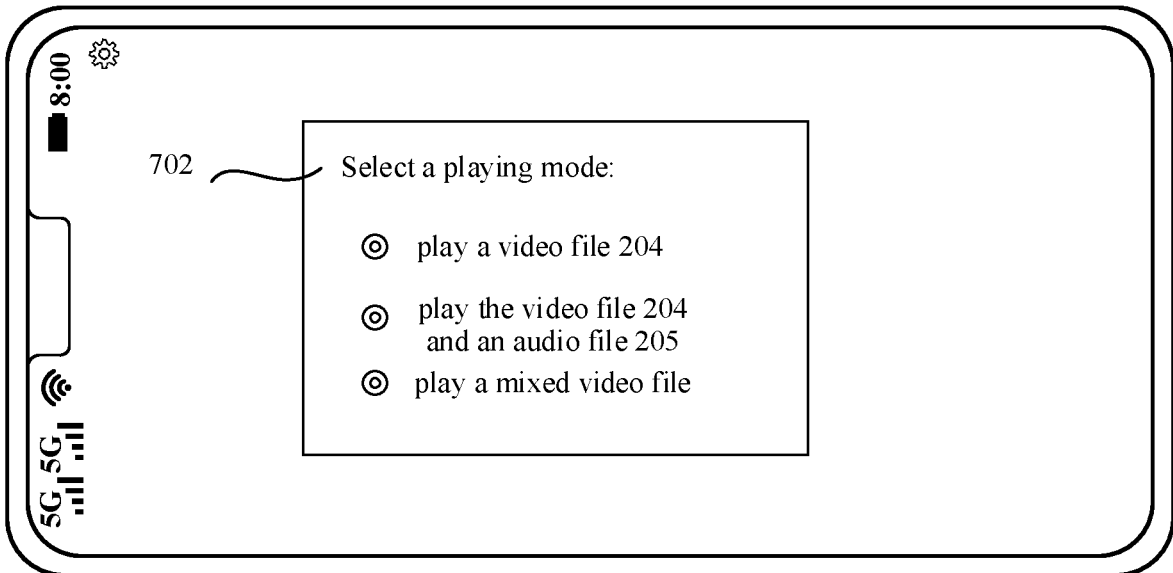

In the foregoing embodiment, if the multimedia file storage manner is the video file and the audio file shown in FIG. 2C, the video playing application of the mobile phone 100 may play the video file and the audio file at the same time. For example, the video playing application may decode the video file 204 and the audio file 205 at the same time. In a video playing process, the mobile phone 100 displays the interface shown in FIG. 3A, and there is the setting control 307 in the video playing interface 301. The user may tap the setting control 307, and an interface shown in FIG. 7B is displayed on the mobile phone 100. There is a selection box 702 in the interface shown in FIG. 7B, and in the selection box 702, "play the video file 204", "play the video file 204 and the audio file 205", or "play a mixed video file" may be selected. It may be understood that, in some cases, the user does not need to perform manual selection. When the user drags the play control 302 in the interface shown in FIG. 3A, the video playing application automatically selects a corresponding multimedia file for playing. If the play control 302 is on the left of the video interface 301, the video playing application plays the video file 204. If the play control 302 is on the right of the video interface 301, the video playing application plays the video file 204 and the audio file 205 and mutes the video file 204. If the play control 302 is in the middle of the video interface 301, the mixed video file is played.

Figures 7C, 8:
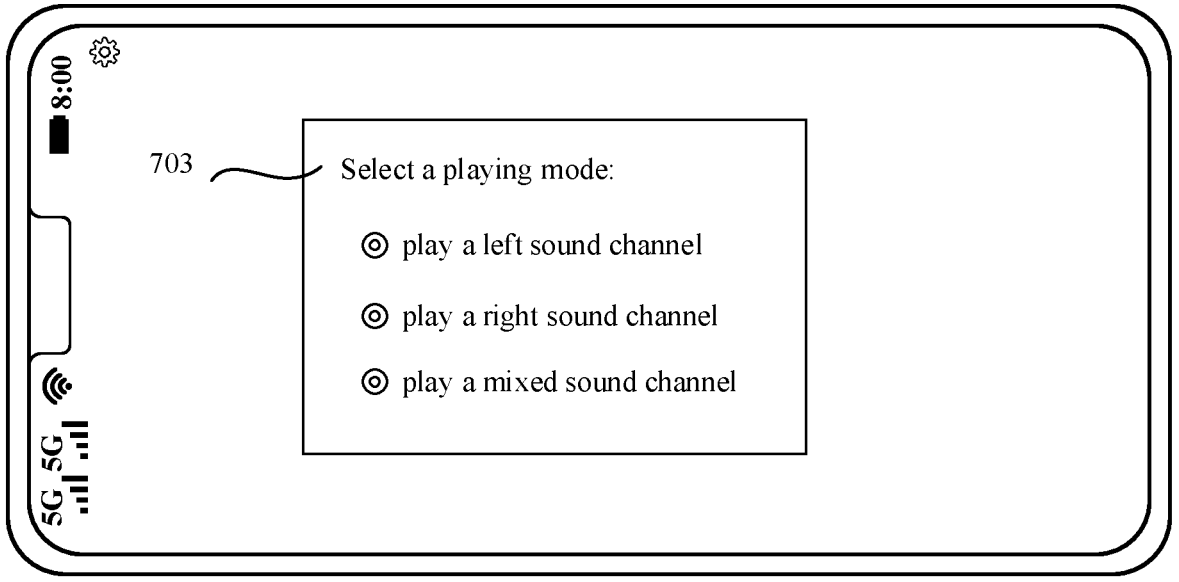
FIG. 8 shows a video recording and playing method according to an embodiment of this application.

In the foregoing embodiment, if the multimedia file storage manner is a dual-sound-channel video file shown in FIG. 2D, the video playing application of the mobile phone 100 may play the dual-sound-channel video file. For example, the video playing application may decode the video file 206. In a video playing process, the mobile phone 100 displays the interface shown in FIG. 3A, and there is a setting control 307 in the video playing interface 301. The user may tap the setting control 307, and an interface shown in FIG. 7C is displayed on the mobile phone 100. There is a selection box 703 in the interface shown in FIG. 7C, and in the selection box 703, "play the left sound channel of the video file 206", "play the right sound channel of the video file 206", or "play a mixed sound channel of the video file 206" may be selected. If the left sound channel of the video file 206 is played, the video playing application may copy audio data of the left sound channel to the right channel, to ensure that the video playing application performs dual-sound-channel output when playing the video file. Similarly, if the right sound channel of the video file 206 is played, audio data of the right sound channel may be copied to the left sound channel. It may be understood that, in some cases, the user does not need to perform manual selection. When the user drags the play control 302 in the interface shown in FIG. 3A, the video playing application automatically selects a corresponding sound channel for playing. If the play control 302 is on the left of the video interface 301, the video playing application plays the left sound channel of the video file 206. If the play control 302 is on the right of the video interface 301, the video playing application plays the right sound channel of the video file 206. If the play control 302 is in the middle of the video interface 301, the mixed sound channel of the video file 206 is played.

In some other implementations of the foregoing embodiment, when a video file recorded in the multi-view video mode is played back, there may be a plurality of play controls in an interface of a video playing application, and different play controls correspond to audio corresponding to different images. When the user taps one of the play controls, audio of an image corresponding to the play control is played. In some other implementations, when the user uses the video playing application to play the video file recorded in the multi-view mode, audio corresponding to an image in a plurality of video images is played by default, or audio obtained after superimposition processing is performed on audio of the plurality of images is played.

It may be understood that the shooting mode, the method for storing a video recording file, and the method for playing back a video recording file that are applicable to the dual-view mode may also be applicable to a multi-view mode, for example, a three-view mode.

An embodiment of this application provides an audio processing method. Refer to FIG. 8. The method may include the following steps.

801: Generate a video by using a multi-view mode.

In response to a first user input, Camera is opened to display a preview interface. A multi-view mode is entered to display a video preview interface. The video preview interface includes a plurality of channels of video images. In response to a second user input, the plurality of channels of video images are collected, and audio data is collected. In a process of collecting the plurality of channels of video images, in response to a zoom operation performed by a user on one channel of video image in the plurality of channels of video images, collected audio data is processed. A video and audio are generated. Each of the plurality of channels of video images is collected by a different camera. The zoom operation is zooming in or zooming out on the video image, to correspondingly change a focal length of a camera.

It may be understood that, when the video images are two channels of video images, the audio includes first audio and second audio. The first audio corresponds to audio of one channel of video image of the two channels of video images, and the second audio corresponds to audio of the other channel of video image of the two channels of video images.

It may be understood that, when the video is one video file, the video file further includes the first audio, and the second audio is one audio file.

Alternatively, when the video is two video files, one video file includes the first audio, and the other video file includes the second audio.

Alternatively, when the video is one video file, the video file includes the first audio and the second audio.

It may be understood that, when the video file includes the first audio and the second audio, the first audio is stored in a first audio track, and the second audio is stored in a second audio track.

It may be understood that, when the video file includes the first audio and the second audio, the first audio is stored in a first sound channel, and the second audio is stored in a second sound channel.

It may be understood that the two channels of video images may alternatively be three channels of video images or a plurality of channels of video images.

802: Play the video.

In response to the user input, a video playing interface is displayed on an electronic device. The video playing interface includes a first video, a second video, a first play control, and/or a second play control.

In response to an operation performed on the second play control, the first video and the second video are played.

Audio of a video corresponding to a location of the first play control is played. The video corresponding to the location of the first play control is the first video.

803: Played audio related to a location of the play control.

The first play control is located in the second video.

The electronic device may further play, in response to an operation performed by the user on the first play control, audio corresponding to the second video and stop playing audio corresponding to the first video.

The first play control may be a horn-shaped control, indicating playing audio. It may be understood that the first play control may have a plurality of shapes.

The second play control may be a play/pause control. When the user taps the control, a video may be played or paused. It may be understood that the second play control may alternatively be a control having another function, or may be controlled through a voice. For example, the operation performed by the user on the second play control may be a voice operation or a voice instruction.

In an implementation, the operation performed by the user on the first play control may also be a voice operation or a voice instruction.

In an implementation, the first play control is located in the first video and the second video.

The electronic device may further play, in response to the operation performed by the user on the first play control, mixing audio. The mixing audio is mixing audio of the audio corresponding to the first video and the audio corresponding to the second video.

The case in which the first play control is located in the first video and the second video may be that the first play control is located in the middle of the first video and the second video, or the first play control crosses the first video and the second video.

In the foregoing embodiment, meanings of the video image, the image, and the image content may be the same as the meaning of the video, and the video is the video image or the image collected by the camera, or the image content.

The user may perform an operation on the foregoing video file in a video playing application. For example, when playing a video file recorded in the dual-view mode, the user may select to play audio corresponding to any image in dual views, or may select to play audio obtained after audio mixing processing is performed on audio corresponding to two images. For another example, when playing a video file recorded in the multi-view mode, the user may select to play audio corresponding to any image in a plurality of views, or may select to play audio obtained after audio mixing processing is performed on audio corresponding to a plurality of images. For another example, when a video file recorded in the dual-view (or multi-view) mode is played, the video playing interface has a movable play control, as shown by a horn-shaped control 302 in FIG. 3A to FIG. 3C. When the user taps the control, audio of an image in which the control is located may be played. In a possible case, the horn-shaped control 302 may be located in a center of dual images (or a plurality of images), that is, an area of the horn-shaped control 302 crosses the two images (or the plurality of images). When the user taps the horn-shaped control 302, audio obtained after audio mixing processing is performed on audio corresponding to the two images (or the plurality of images) is played.

Concepts related to audio, coding, and a sound channel are described in detail below. Audio data comes from sampling and quantizing a sound of a sound source, and then the sound is coded to form a digital signal. The sound of the sound source is a sound wave generated by vibration of an object, which has features of frequency and amplitude. The foregoing sampling indicates that a frequency value of some points is extracted from the sound wave and an analog signal is digitized. A sampling rate indicates a quantity of times that a recording device (for example, a microphone) samples a sound signal within one second. Higher sampling frequency indicates more authentic and natural sound restoration. Generally, the sampling frequency is classified into three levels: 22.05 kHz, 44.4 kHz, and 48 kHz. 8 kHz is a sampling rate used by a phone, which is sufficient for human speaking. 22.05 kHz can only achieve sound quality of frequency modulation (frequency modulation, FM) broadcasting. 44.1 kHz is a theoretical CD sound quality limit, and 48 kHz is more accurate. Sampling resolution indicates resolution of a sampled value each time. There are two types of sampling resolution: 8 bits and 16 bits. Larger sampling resolution indicates that a more delicate sound change can be recorded and response data volume is larger. A quantity of sound channels indicates a quantity of sound channels that support different sounding, which is one of important indicators for measuring audio equipment. A quantity of mono sound channels is one, a quantity of dual sound channels is two, a quantity of stereo sound channels is two by default, and a quantity of stereo sound channels (four sound channels) is four. A sound channel (sound channel) indicates independent audio signals that are collected or played back at different control locations during sound recording or playback. Encapsulation indicates that a video stream and an audio stream (or a subtitle stream) are bound into a separate file and the file is transmitted as a signal. Decapsulation indicates that input data in an encapsulation format is separated into compressed audio stream coding data and compressed video stream coding data. Common encapsulation formats include AVI (audio video interleave), RMVB (realmedia variable bitrate), MP4 (MPEG-4 Part 14), MKV (matroska), and the like. During encapsulation and decapsulation, an original video or audio is not re-coded. An encapsulated and packed file can be separated (or decomposed or unpacked) to obtain an independent video and independent audio that are the same as the original material. Audio coding indicates that audio sampling data such as pulse code modulation (pulse code modulation, PCM) is compressed into an audio bitstream to reduce audio data volume. Common solutions include AAC and MP3.

In this application, ACC coding is used as an example. The ACC appeared in 1997, and was initially an audio coding technology based on MPEG-2. There are nine AAC specifications to adapt to different application scenarios, such as an MPEG-2 AAC LC low complexity (low complexity) specification, an MPEG-2 AAC Main main specification, and an MPEG-2 AAC SSR scaleable sampling rate (scaleable sampling rate) specification, an MPEG-4 AAC LC low complexity specification, an MPEG-4 AAC Main main specification, an MPEG-4 AAC SSR scaleable sampling rate specification, an MPEG-4 AAC LTP long term prediction (long term prediction) specification, an MPEG-4 AAC LD low delay (low delay) specification, and an MPEG-4 AAC HE high efficiency (high efficiency) specification. The AAC is an audio compression algorithm with a high compression ratio, and uses a transform coding algorithm, temporary noise reshuffling, backward adaptive linear prediction, a joint stereo technology, a quantization Huffman coding technology, and the like. The AAC supports a plurality of sampling rates and bit rates, and supports 1 to 48 audio tracks. There are two formats of an ACC audio file: an ADIF format and an ADTS format. A feature of the audio data interchange format (audio data interchange format, ADIF) is as follows: This format can determine a start of audio data, and decoding does not need to be performed in the middle of an audio data stream. That is, the decoding should be performed at the start of the audio data stream. A feature of the audio data transport stream (audio data transport stream, ADTS) is as follows: This format has a bit stream with a synchronization word, and decoding can start anywhere in the stream. That is, the ADTS can be decoded in any frame. In other words, each frame of the ADTS has header information. However, the ADIF has only one piece of unified header information. Therefore, the ADIF can be decoded only after all data is obtained. Decoding is a reverse process of coding, and is to convert a coded media file into a sound or a video. Software used to perform decoding is called a decoder (Decoder).

A video playing method and an audio playing method provided in embodiments of this application may be applied to an electronic device. For example, the electronic device may specifically be a mobile phone, a tablet, a wearable device, an in-vehicle device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), a special-purpose camera (for example, a single-lens reflex camera or a card camera), or the like. A specific type of the electronic device is not limited in this embodiment of this application.

Figure 9:
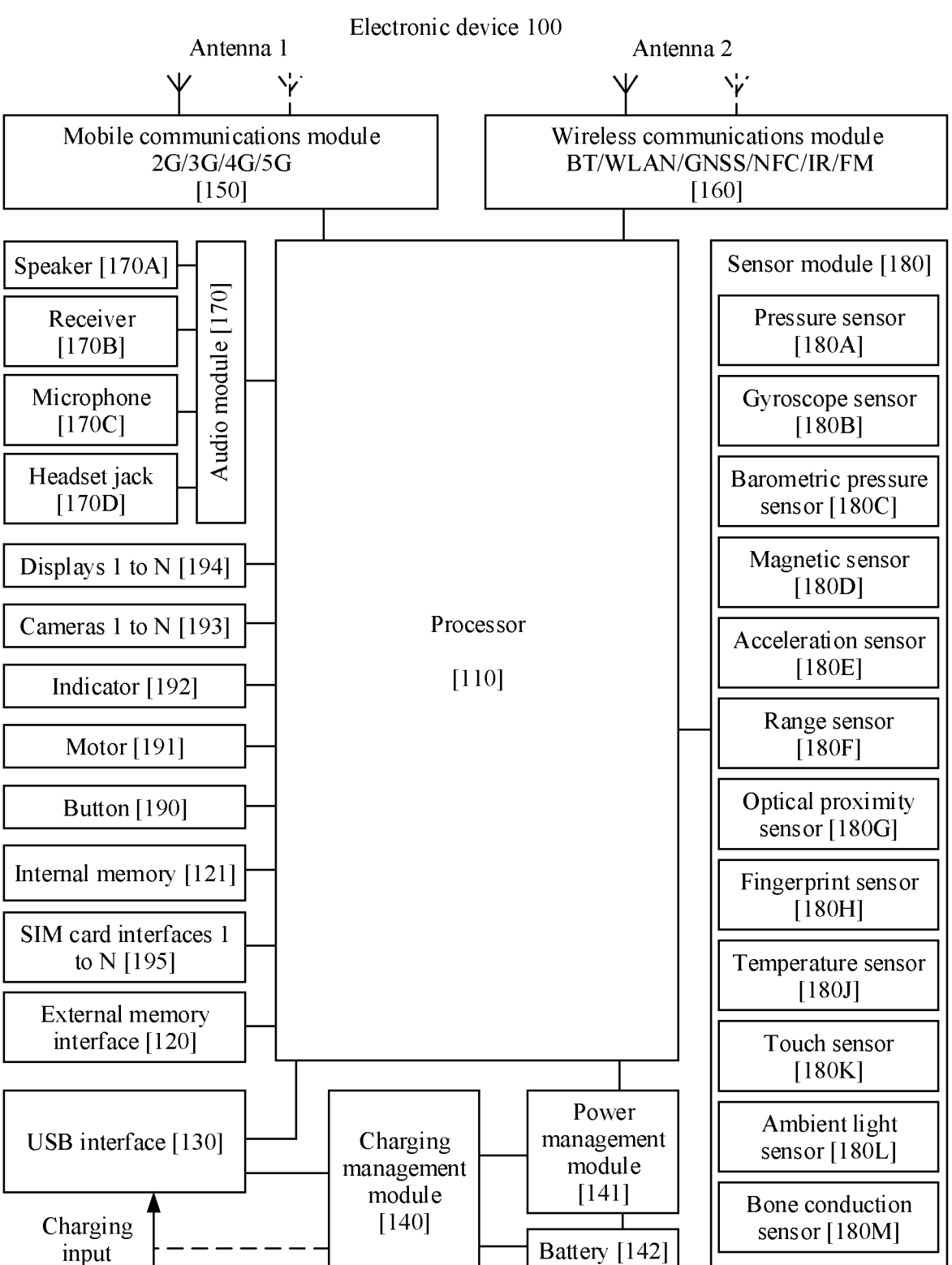
FIG. 9 shows a structure of an electronic device according to an embodiment of this application.

For example, FIG. 9 is a schematic diagram of a structure of the electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 13, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (neural network processing unit, NPU). Different processing units may be independent components, or may be integrated into one or more processors.

The controller may be a nerve center and a command center of the electronic device 100. The controller may generate an operation control signal based on instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

The processor 110 may be configured to play a video generated by multi-view recording. For example, when one video file is generated, the video file may be played; when a plurality of video files are generated, the plurality of video files may be played; and when both a video file and an audio file are generated, the video file and the audio file can be played at the same time.

The electronic device 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (flex light-emitting diode, FLED), a mini light emitting diode (Mini-LED), a micro light emitting diode (Micro-LED), a micro organic light-emitting diode (Micro-OLED), a quantum dot light emitting diode (quantum dot light emitting diode, QLED), or the like. In some embodiments, the electronic device may include one or N displays 194, where N is a positive integer greater than 1.

In embodiments of this application, the display 194 may display a shooting preview interface, a recording preview interface, and a shooting interface in a dual-view mode (or multi-video mode), may further display a video playing interface and the like during video playback, and display various play controls in the video playing interface.

The electronic device 100 may implement a shooting function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193. For example, in embodiments of this application, the ISP may control, based on a shooting parameter, the photosensitive element to perform exposure and photographing.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1. The camera 193 may be located in an edge area of the electronic device, may be an off-screen camera, or may be a pop-up camera. The cameras 193 may include a rear-facing camera, and may further include a front-facing camera. A specific location and form of the camera 193 are not limited in embodiments of this application. The electronic device 100 may include cameras of one or more focus lengths. For example, cameras of different focus lengths may include a long-focus camera, a wide-angle camera, an ultra-wide-angle camera, a panoramic camera, or the like. The camera lens 193 may further perform a zoom operation according to a zoom instruction. The long-focus camera or the wide-angle camera may collect a video image in a zoom angle of view. The camera 193 may further be configured to collect a plurality of channels of videos. Each of the plurality of channels of videos is collected by a different camera.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video coder is configured to compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural network (neural network, NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 100, such as image recognition, facial recognition, voice recognition, and text understanding.

The internal memory 121 may be configured to store computer-executable program code, and the executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a sound playing function or an image playing function), and the like. The data storage area may store data (for example, an image, audio data and a phone book collected by the electronic device 100) and the like created when the electronic device 100 is used.

In embodiments of this application, the processor 110 may run the instructions stored in the internal memory 121 to record video images in a plurality of shooting angles of view and audio corresponding to different shooting angles of view in the multi-view mode (for example, the dual-view mode), so that audio corresponding to different shooting angles of view and video images can be played during video playback, and played audio matches a shooting angle of view and a video image that interest the user.

The electronic device 100 may implement an audio function such as music playing or recording by using the audio module 170, the speaker 170A, the receiver 170B, a plurality of microphones 170C (a microphone array), the headset jack 170D, the application processor, and the like.

The audio module 170 is configured to convert digital audio data into an analog audio signal for output, and is also configured to convert an analog audio electrical signal input into digital audio data. For example, the audio module 170 is configured to convert an analog audio electrical signal output by the microphone 170C into digital audio data.

The audio module 170 may further include an audio processing module. The audio processing module is configured to perform audio processing on digital audio data in the multi-video mode (or the dual-view mode), to generate audio corresponding to different shooting angles of view. For example, for a wide-angle angle of view, the audio processing module may include a timbre correction module, a stereo beamforming module, a gain control module, and the like. For a zoom angle of view, the audio processing module may include a timbre correction module, a stereo/mono sound channel beamforming module, an ambient noise control module, a gain control module, and the like. For a front-facing angle of view, the audio processing module may include a timbre correction module, a stereo/mono sound channel beamforming module, a human voice enhancement module, a gain control module, and the like.

The audio module 170 may be further configured to code and decode audio data.

In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 100 may listen to music or answer a call in a hands-free mode by using the speaker 170A. In this embodiment of this application, when a dual-view (or multi-view) video is played back, the speaker 170A may be configured to play audio corresponding to a dual-view (or multi-view) video image.

The receiver 170B, also referred to as an "earpiece", is configured to convert a sound signal into an analog audio electric signal. When making a call or sending voice information, a user may make a sound near the microphone 170C through the mouth of the user, to input a sound signal to the microphone 170C. In this embodiment of this application, the electronic device 100 may include at least three microphones 170C. The electronic device 100 may implement a function of collecting sound signals in all directions, and converting the collected sound signals into an analog audio electrical signal, and may further implement a noise reduction function, a sound source identification function, a directional recording function, and the like. The receiver 170B may further receive a voice instruction, and transmit the voice instruction to the processor 110, and the processor 110 performs corresponding processing according to content of the voice instruction.

It should be noted that the microphone 170C may be a built-in component of the electronic device 100, or may be an external accessory of the electronic device 100. For example, the electronic device 100 may include a microphone 1 disposed at the bottom, a microphone 2 disposed at the top, and an external accessory. For example, the external accessory may be a micro microphone connected (in a wired or wireless manner) to the electronic device 100 or a headset with a microphone (for example, a wired headset or a TWS headset).

In some embodiments, the microphone 170C may alternatively be a directional microphone (that is, a vector microphone), and may collect a sound signal in a specific direction.

The range sensor 180F is configured to measure a distance. The electronic device 100 may measure a distance in an infrared or a laser manner. In some embodiments, in a shooting scenario, the electronic device 100 may measure a distance by using the range sensor 180F, to implement quick focusing.

The touch sensor 180K is also referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor to determine a type of the touch event. The display 194 may provide a visual output related to the touch operation. In some other embodiments, the touch sensor 180K may alternatively be disposed on a surface of the electronic device 100 at a location different from that of the display 194.

For example, in this embodiment of this application, the electronic device 100 may detect, by using the touch sensor 180K, an operation performed by the user to indicate to start and/or stop shooting.

It may be understood that the structure shown in this embodiment of this application constitutes no specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

In this embodiment of this application, in the dual-video mode (or the multi-video mode), the display 194 may display a shooting preview interface, a recording preview interface, and a shooting interface during recording. The camera 193 may be configured to collect a plurality of channels of video images. The plurality of microphones 170C may be configured to collect a sound signal, and generate an analog audio electrical signal. The audio module 170 may convert the analog audio electrical signal into digital audio data, and generate, based on the digital audio data, audio corresponding to different shooting angles of view and video images. During video playback, the display 194 may display a video playing interface. The processor 110 may run the instructions stored in the internal memory 121, to control, based on a selection of the user, the speaker 170A to play audio corresponding to a shooting angle of view and a video image that interest the user, to improve audio experience of watching a dual-view (multi-view) video by the user.

A software system of the electronic device 100 may use a layered architecture, a time-driven architecture, a micro-kernel architecture, a micro service architecture, or a cloud architecture. In this embodiment of this application, an Android system with the layered architecture is used as an example to illustrate a software structure of the electronic device 100.

Figure 10:
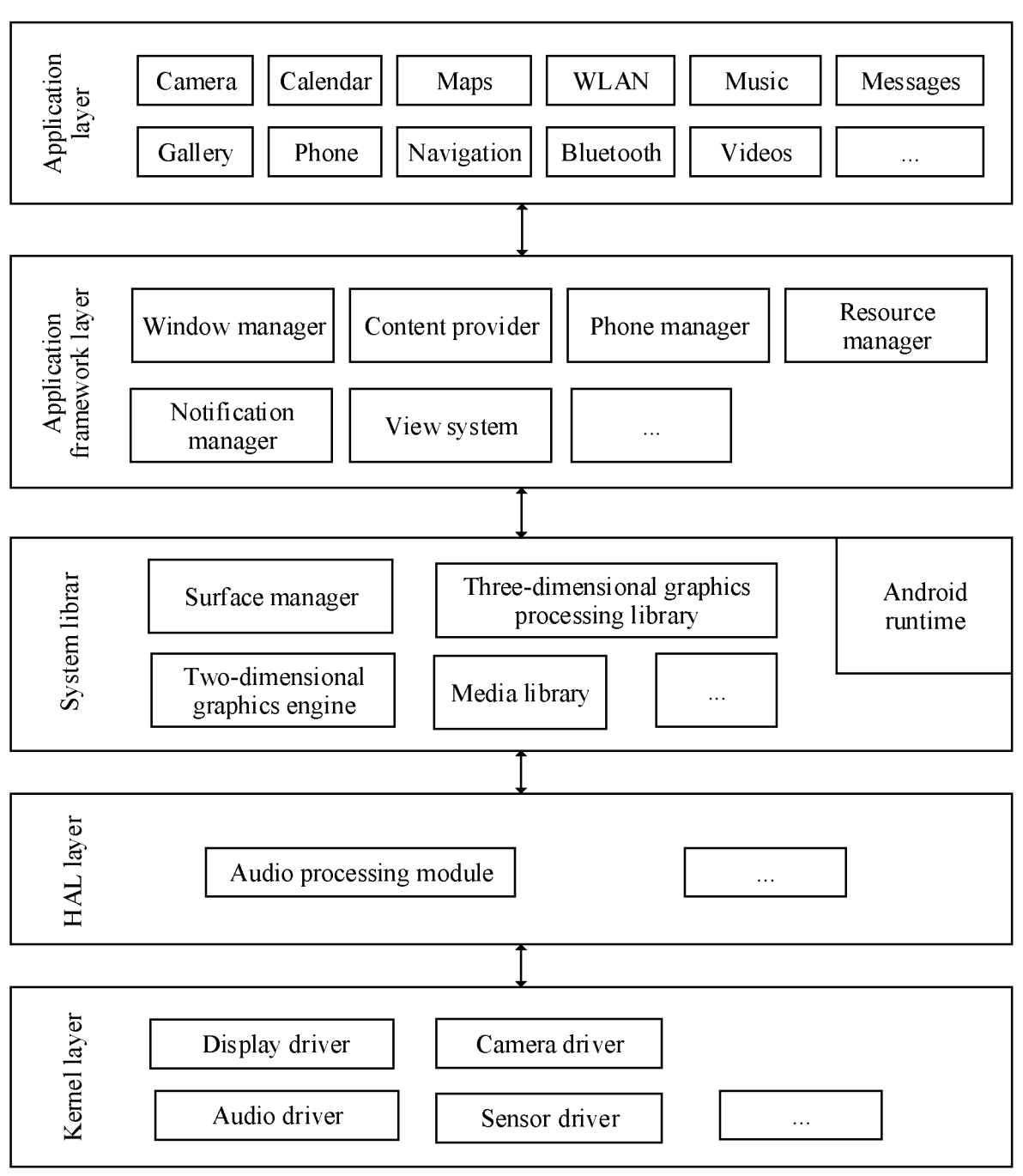
FIG. 10 shows an architecture of an operating system used for an electronic device according to an embodiment of this application.

FIG. 10 is a block diagram of the software structure of the terminal 100 according to this embodiment of this application. In the layered architecture, software is divided into several layers, and each layer has a clear role and task. The layers communicate with each other through a software interface. In some embodiments, the Android® system is divided into four layers: an application layer, an application framework layer, an Android runtime (Android runtime) and system library, a hardware abstraction layer (hardware abstraction layer, HAL), and a kernel layer from top to bottom. The application layer may include a series of application packages.

As shown in FIG. 11, the applications may include applications such as Camera, Gallery, Calendar, Phone, Maps, Navigation, WLAN (Wireless LAN, WLAN), Bluetooth, Music, Videos, and Messages.

The application framework layer provides an application programming interface (application programming interface, API) and a programming framework for an application at the application layer. The application framework layer includes some predefined functions.

As shown in FIG. 10, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, audio, calls that are made and received, a browsing history and a bookmark, a phone book, and the like.

The view system includes visual controls, such as a control for displaying a text and a control for displaying a photo. The view system may be configured to construct an application. A display interface may include one or more views. For example, a display interface including an SMS message notification icon may include a text display view and a photo display view.

The phone manager is configured to provide a communication function for the electronic device 100, for example, management of a call status (including answering, declining, or the like).

The resource manager provides various resources such as a localized character string, an icon, a photo, a layout file, and a video file for an application.

The notification manager enables an application to display notification information in a status bar, and may be configured to convey a notification type message. The displayed notification information may automatically disappear after a short pause and require no user interaction. For example, the notification manager is configured to notify download completion, give a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted in the status bar, an alert sound is played, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (media library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The HAL layer is an interface layer located between an operating system kernel and a hardware circuit, and may abstract hardware. The HAL layer includes an audio processing module. The audio processing module may be configured to process, based on a shooting angle of view, an analog audio electrical signal obtained by the microphone, to generate audio corresponding to different shooting angles of view and video images. For example, for a zoom angle of view, the audio processing module may include a timbre correction module, a stereo/mono sound channel beamforming module, an ambient noise control module, a gain control module, and the like.

The kernel layer is a layer between a hardware layer and a software layer. The kernel layer includes at least a display driver, a camera driver, an audio driver, and a sensor driver. The hardware layer may include a camera, a display, a microphone, a processor, a memory, and the like.

In this embodiment of this application, in the dual-video mode (or the multi-video mode), the display at the hardware layer may display a shooting preview interface, a recording preview interface, and a shooting interface during recording. The camera at the hardware layer may be configured to collect a plurality of channels of video images. The microphone at the hardware layer may be configured to collect a sound signal, and generate an analog audio electrical signal. The audio processing module at the HAL layer may be configured to process digital audio data converted from an analog audio electrical signal, to generate audio corresponding to video images of different shooting angles of view or different focal lengths. During video playback, the display may display a video playing interface, and the speaker may play audio corresponding to a shooting angle of view and a video image that interest the user, to improve audio experience of using the dual-view mode (or the multi-view mode) by the user.

It may be understood that, to implement the foregoing functions, the electronic device includes a corresponding hardware and/or software module for performing each function. Algorithm steps in the examples described with reference to embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In this embodiment, the electronic device may be divided into function modules based on the foregoing method examples. For example, each function module corresponding to each function may be obtained through division, or two or more functions may be integrated into one processing module. The integrated module may be implemented in a form of hardware. It should be noted that, in embodiments, module division is an example, is merely logical function division, and may be other division during actual implementation.

An embodiment of this application further provides an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the foregoing related method steps, to implement the audio processing method in the foregoing embodiment.

An embodiment of this application further provides a computer-readable storage medium. The computer-readable storage medium stores computer instructions. When the computer instructions are run on an electronic device, the electronic device is enabled to perform the related method steps, to implement the audio processing method in the foregoing embodiment.

An embodiment of this application further provides a computer program product. When the computer program product is run on a computer, the computer is enabled to perform the foregoing related steps, to implement the audio processing method performed by the electronic device in the foregoing embodiment.

The electronic device, the computer-readable storage medium, the computer program product, or the chip provided in embodiments is configured to perform the corresponding method provided above. Therefore, for beneficial effects that can be achieved, refer to the beneficial effects in the corresponding method provided above. Details are not described herein again.

Based on descriptions of the foregoing implementations, a person skilled in the art may understand that, for the purpose of convenient and brief descriptions, division into the foregoing function modules is merely used as an example for description. In actual application, the foregoing functions can be allocated to different function modules and implemented according to a requirement, that is, an inner structure of an apparatus is divided into different function modules to implement all or some of the functions described above.

In several embodiments provided in this application, it should be understood that the disclosed apparatus and method may be implemented in another manner. For example, the described apparatus embodiment is merely an example. For example, module or unit division is merely logical function division, and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, in other words, may be located in one position, or may be distributed on a plurality of different positions. Some or all of the units may be selected according to actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium, and includes several instructions to enable a device (which may be a single-chip microcomputer, a chip or the like) or a processor (processor) to perform all or some of the steps of the method described in embodiments of this application. The storage medium includes any medium that can store program code, such as a USB flash drive, a removable hard disk, a read-only memory (read-only memory, ROM), a random access memory (random access memory, RAM), a magnetic disk, or a compact disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. A video playing method, comprising:
displaying, by an electronic device comprising a first camera and a second camera in response to a user input, a video playing interface, wherein the video playing interface comprises a first video, a second video, and a first play control, the first video and the second video are taken by the first camera and the second camera by using a multi-view mode;
playing, by the electronic device, the first video and the second video; and
playing, by the electronic device in response to a first user operation on the first play control that is located in the first video and the second video, a mixing audio of a first audio corresponding to the first video and a second audio corresponding to the second video, wherein the first audio and the second audio are taken by a plurality of microphones of the electronic device, and the mixing audio is obtained by performing an audio mixing process on the first audio and the second audio.

2. The method according to claim 1, wherein the video playing interface further comprises a second play control, and the playing the first video and the second video comprises:
in response to an operation performed on the second play control, playing, by the electronic device, the first video and the second video.

3. The method according to claim 1, wherein the audio corresponding to the first video is stored in a first audio track, and the audio corresponding to the second video is stored in a second audio track.

4. The method according to claim 1, wherein the audio corresponding to the first video is stored in a first sound channel, and the audio corresponding to the second video is stored in a second sound channel.

5. The method according to claim 1, wherein
the first video and the first audio corresponding to the first video are one video file, and the second video and the second audio corresponding to the second video are another video file;
the first video, the first audio corresponding to the first video, the second video, and the second audio corresponding to the second video are one video file;
the first video, the second video, and the first audio corresponding to the first video are one video file; or
the first video, the second video, and the second audio corresponding to the second video are one video file.

6. The method according to claim 5, wherein when the first video, the second video, and the first audio corresponding to the first video are one video file, the second audio corresponding to the second video is another audio file; or
when the first video, the second video, and the second audio corresponding to the second video are one video file, the first audio corresponding to the first video is another audio file.

7. The method according to claim 1, wherein the videos corresponding to the location of the first play control are the first video and the second video.

8. The method according to claim 1, wherein a fixed beamforming and adaptive beamforming are jointly used to process an audio signal corresponding to at least one of the plurality of cameras.

9. An electronic device, comprising a plurality of microphones, a speaker, a display, a plurality of cameras, and a processor, wherein the processor is coupled to the microphone, the speaker, the display, and the plurality of cameras, wherein the plurality of microphones are configured to collect audio data;

the plurality of cameras are configured to collect a plurality of channels of videos, wherein each of the plurality of channels of videos is collected by a different camera;

the display is configured to display a video playing interface, wherein the video playing interface comprises a first video, a second video, and a first play control, the first video and the second video are taken by a first camera and a second camera of the plurality of cameras by using a multi-view mode;

the processor is configured to play the first video and the second video; and the speaker is configured to play an audio of a video corresponding to a location of the first play control, wherein the processor is configured to:

in response to a user operation on the first play control that is located in the first video and the second video, control the speaker to play a mixing audio of a first audio corresponding to the first video and a second audio corresponding to the second video, the first audio and the second audio are taken by the plurality of microphones, and the mixing audio is obtained by performing an audio mixing process on the first audio and the second audio.

10. The electronic device according to claim 9, wherein the videos corresponding to the location of the first play control is the first video and the second video.

11. The electronic device according to claim 9, wherein the video playing interface further comprises a second play control, wherein the first play control is an audio play control, and the second play control is a play control or a play/pause control.

12. The electronic device according to claim 9, wherein a fixed beamforming and adaptive beamforming are jointly used to process an audio signal corresponding to at least one of the plurality of cameras.

13. A non-transitory computer-readable storage medium having a computer program code for execution by a processor of an electronic device, the computer program code comprising instructions for:

displaying, in response to a user input, a video playing interface that comprises a first video, a second video, and a first play control, wherein the first video and the second video are taken by a first camera and a second camera of the electronic device by using a multi-view mode;

playing the first video and the second video; and playing, in response to a first user operation on the first play control that is located in the first video and the second video, a mixing audio of a first audio corresponding to the first video and a second audio corresponding to the second video, wherein the first audio and the second audio are taken by a plurality of microphones of the electronic device, and the mixing audio is obtained by performing an audio mixing process on the first audio and the second audio.

14. The non-transitory computer-readable storage medium according to claim 13, wherein a fixed beamforming and adaptive beamforming are jointly used to process an audio signal corresponding to at least one of the plurality of cameras.

* * * * *